US012586130B1

(12) United States Patent

Montesano et al.

(10) Patent No.: US 12,586,130 B1
(45) Date of Patent: Mar. 24, 2026

(54) VOLATILITY INDEX OPTIONS AND FUTURES SPREADS

(71) Applicant: Cboe Exchange, Inc., Chicago, IL (US)

(72) Inventors: Anthony Montesano, Chicago, IL (US); Anthony J. Carone, Chicago, IL (US); Arnis Memic, Overland Park, KS (US); Steven Sinclair, Overland Park, KS (US); Michael DiBenedetto, Glen Rock, NJ (US)

(73) Assignee: Cboe Exchange, Inc., Chicago, IL (US)

( * ) Notice: Subject to any disclaimer, the term of this patent is extended or adjusted under 35 U.S.C. 154(b) by 0 days.

(21) Appl. No.: 18/900,416

(22) Filed: Sep. 27, 2024

Related U.S. Application Data

(60) Provisional application No. 63/586,339, filed on Sep. 28, 2023.

(51) Int. Cl.
G06Q 40/04 (2012.01)

(52) U.S. Cl.
CPC ......... G06Q 40/04 (2013.01); G06Q 40/0451 (2025.08); G06Q 40/046 (2025.08)

(58) Field of Classification Search
USPC .......................................... 705/35
See application file for complete search history.

(56) References Cited

U.S. PATENT DOCUMENTS

| | | | | |
|---|---|---|---|---|
| 7,653,584 | B2 * | 1/2010 | Schmitz et al. | 705/37 |
| 7,840,477 | B2 * | 11/2010 | Claus et al. | 705/37 |
| 8,738,498 | B2 * | 5/2014 | Daley et al. | 705/37 |
| 11,776,054 | B2 * | 10/2023 | Aisen et al. | G06Q 40/04 |
| 2005/0137964 | A1 * | 6/2005 | Nordlicht et al. | 705/37 |
| 2008/0288391 | A1 * | 11/2008 | Downs et al. | 705/37 |
| 2010/0332650 | A1 * | 12/2010 | Aisen et al. | 709/224 |
| 2023/0410200 | A1 * | 12/2023 | Aisen et al. | G06Q 40/04 |

OTHER PUBLICATIONS

Vuk Magdelinic, Smart Order Routing(SOR):The Next Frontier In Fixed Income Automation, Nov. 3, 2020, Overbond.com (Year: 2020).*

* cited by examiner

*Primary Examiner* — Bennett M Sigmond
*Assistant Examiner* — George N. Proios
(74) *Attorney, Agent, or Firm* — Fish & Richardson P.C.

(57) ABSTRACT

Systems, methods, devices, and non-transitory, computer-readable storage media are disclosed for execution of an order including a first portion and a second portion. A trading computer system includes a routing system and a processor configured to: determine that a leg of the first type is satisfied at a first computer network destination and a leg of the second type is satisfied at a second computer network destination; transmit a second electronic message to the first computer network destination and a third electronic message to the second computer network destination; receive a confirmation electronic message indicating that the leg of the first type and the leg of the second type were executed substantially simultaneously; generate an execution report that indicates that the leg of the first type and the leg of the second type were substantially executed simultaneously; and transmit the execution report to a portable electronic device.

20 Claims, 5 Drawing Sheets

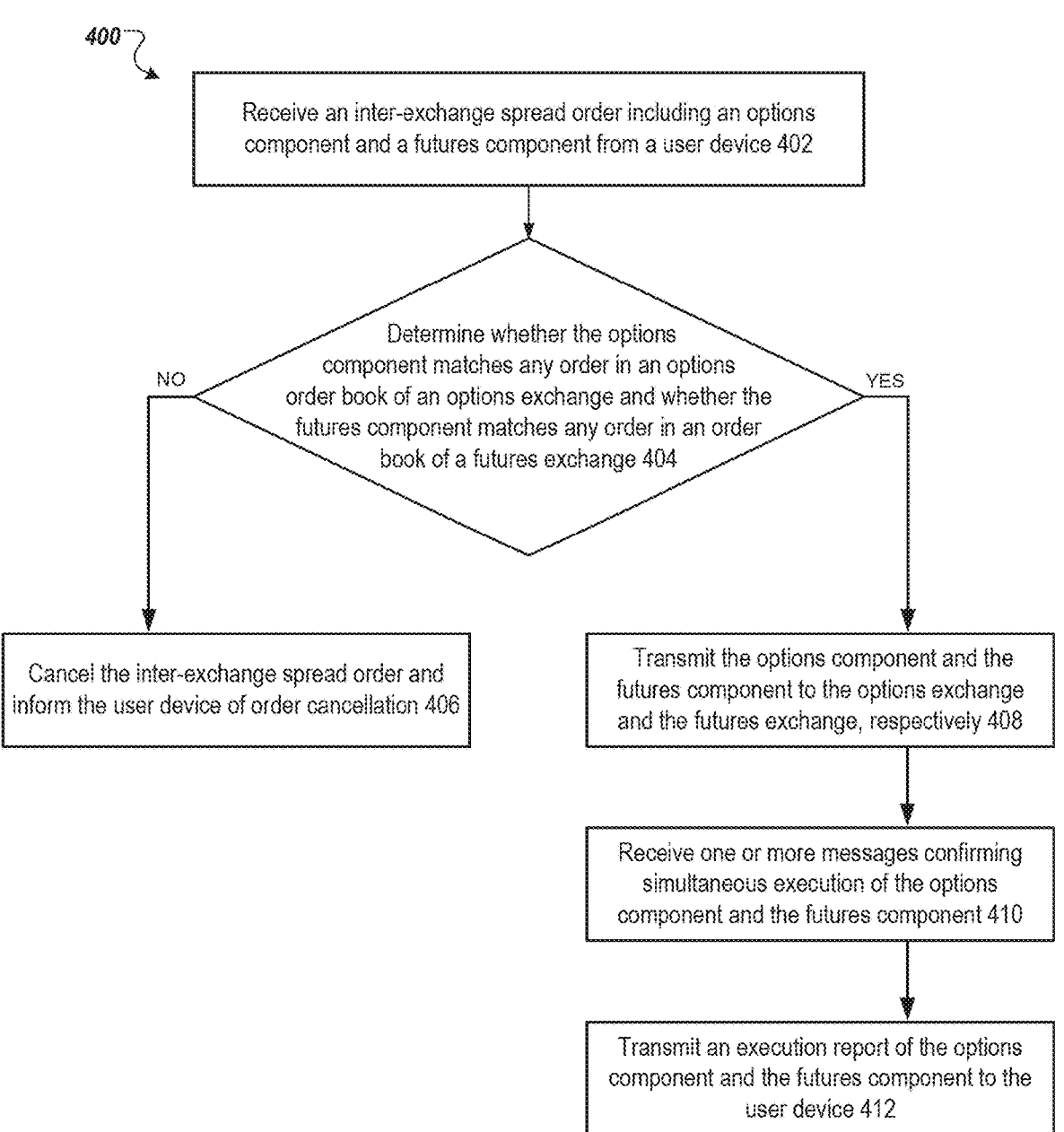

400

Receive an inter-exchange spread order including an options component and a futures component from a user device 402

Determine whether the options component matches any order in an options order book of an options exchange and whether the futures component matches any order in an order book of a futures exchange 404

NO

YES

Cancel the inter-exchange spread order and inform the user device of order cancellation 406

Transmit the options component and the futures component to the options exchange and the futures exchange, respectively 408

Receive one or more messages confirming simultaneous execution of the options component and the futures component 410

Transmit an execution report of the options component and the futures component to the user device 412

FIG. 4

VOLATILITY INDEX OPTIONS AND FUTURES SPREADS

CROSS-REFERENCE TO RELATED APPLICATION

This application claims the benefit of and priority from U.S. Provisional Patent Application No. 63/586,339, filed Sep. 28, 2023, which is incorporated herein by reference in its entirety.

BACKGROUND

An inter-exchange spread (IES) is a type of futures spread involving buying and selling contracts on different exchanges. An IES consists of buying the front leg at one exchange (e.g., exchange A) and selling the back leg on a different exchange (e.g., exchange B). However, IES trading can involve several types of risks.

SUMMARY

Systems, methods, devices, and non-transitory computer-readable storage media are disclosed for execution of an inter-exchange Volatility Index (VIX) spread order including a futures component and an options component. In some implementations, a trading computer system (e.g., a trading platform or other trading platforms) is provided to receive an inter-exchange VIX spread order including a futures component and an options component. The trading computer system can transmit the futures component to a futures exchange and transmit the options component to an options exchange. The futures component and the options component are executed simultaneously or substantially simultaneously on the futures exchange and options exchange, respectively. For example, the futures component includes a long position for a futures contract, while the options component includes a short position for a call option. The substantially simultaneous execution of offsetting positions can hedge the risks of market participants.

Several benefits and advantages can be realized through the systems and methods described in this specification. First, the disclosed technology can enable market participants to place a single inter-exchange VIX spread order including both a futures component and an options component, rather than place two separate orders for the futures component and the options component. Accordingly, fewer messages need to be communicated, such as fewer quotes and order routing messages. In this manner, system resources can be utilized more efficiently by virtue of the reduced bandwidth expenditure for message communication.

Second, the disclosed technology can enable simultaneous execution of the futures component and the options component, which can avoid the execution of one component while failing to execute the other offsetting component. The trading computer system can enable the trading parties of a single inter-exchange VIX spread order to agree with the prices of the futures component and the options component simultaneously. By contrast, human-operated transactions may be subject to delay and communication misunderstanding, which may result in executing two components at different times or even executing only one component.

Third, the disclosed technology can reduce execution risk, legging risk, and price drift risk compared to other multi-transaction processes (e.g., placing two separate orders for the futures component and the options component). For example, the inter-exchange VIX spread order can reduce the risk of successfully executing one component of the transaction while failing to execute the other component of the transaction. The inter-exchange VIX spread order can reduce the risk that the market price or liquidity on one component of the transaction becomes unfavorable within a time period during which both components of the transaction are being executed. The inter-exchange VIX spread order can enhance price transparency and price discovery by providing a mechanism for pricing an entire transaction versus separate pricing in the other multi-transaction processes.

Fourth, the disclosed technology can hedge the risk of transactions and strategies, which contributes to reducing overall market risk. For example, the inter-exchange VIX spread order includes both a VIX options position and a VIX futures position. The inter-exchange VIX spread order is distinguished from the Exchange of Contract for Related Position (ECRP) transactions or block trades including a large-size transaction of a single type of financial instrument, e.g., block trades of VIX futures only. The inter-exchange VIX spread order can increase participation in both VIX options market and VIX futures market through cross-product trades and related transactions that flow from cross-product trades in each of both markets, which further enhance liquidity in both markets to the benefit of participants in both markets.

Fifth, the disclosed technology can improve the read-and-write performance of a database and provide redundancy. The database of the exchange computer system is configured in clusters to distribute order data across multiple database servers. Database clustering ensures that the database remains available even if one or more database servers in the cluster experience failures. When a database server goes down, the cluster can automatically redirect order data traffic to healthy database servers, minimizing downtime. By distributing the order data across multiple database servers, clustering balances the load on each database server. This prevents any single database server from becoming a bottleneck and ensures that resources are used efficiently.

Sixth, the disclosed technology can reduce the need for repetitive database queries and speed up response times. Caching mechanisms are employed to store frequently accessed data (e.g., weights) in memory. A database management system (DBMS) implemented on the database can cache the results of frequently executed queries in memory to reduce the need for repeated database access. Memory caching mechanisms can improve system performance, reduce response times, and minimize the latency associated with data access.

Seventh, the disclosed technology can manage, store, retrieve, and organize order data in a structured and efficient manner using a Database Management System (DBMS) implemented in the database. The DBMS can provide a centralized and structured storage system for order data. The order data is organized into tables, rows, and columns, making it easier to manage and query. The DBMS can support replication and clustering to improve scalability and fault tolerance.

In one aspect, implementations provide a computer system, including: a routing system configured to: a routing system configured to: (i) receive an electronic message comprising a first portion and a second portion, (ii) determine a first computer network destination based on an indication in the first portion of the electronic message and a second computer network destination based on an indication in the second portion of the electronic message, and (iii)

route, through a wide area computer network, the first portion to the first computer network destination and the second portion to the second computer network destination, wherein the first portion comprises data indicative of at least one leg of a first type and the second portion comprises at least one leg of a second type; and at least one processor connected to the routing system and configured to: determine that the at least one leg of the first type is satisfied at the first computer network destination and the at least one leg of the second type is satisfied at the second computer network destination; transmit, through the wide area computer network, a second electronic message to the first computer network destination and a third electronic message to the second computer network destination, the second electronic message and the third electronic message comprising data for synchronizing execution of the at least one leg of the first type at the first computer network destination and execution of the at least one leg of the second type at the second computer network destination; receive, through the wide area computer network, at least one confirmation electronic message indicating that the at least one leg of the first type and the at least one leg of the second type were executed substantially simultaneously; generate an execution report that indicates that the at least one leg of the first type and the at least one leg of the second type were executed substantially simultaneously; and transmit instructions to a transmitter to transmit the execution report to at least one portable electronic device connected to the wide area computer network.

Implementations can include one or more of the following features.

In some implementations, wherein the first computer network destination is an exchange system configured to process the at least one leg of the first type and the second computer network destination is an exchange system configured to process the at least one leg of the second type.

In some implementations, wherein the data for synchronizing execution comprises a first time stamp indicating an execution time of the at least one leg of the first type and a second time stamp indicating an execution time of the at least one leg of the second type, wherein the first time stamp is equal to the second time stamp.

In some implementations, wherein, to transmit the second electronic message to the first computer network destination and the third electronic message to the second computer network destination, the at least one processor is further configured to: synchronize a clock of the first computer network destination with a clock of the second computer network destination; generate the first time stamp for the at least one leg of the first type and generate the second time stamp for the at least one leg of the second type; transmit the first time stamp to the first computer network destination; and transmit the second time stamp to the second computer network destination.

In some implementations, wherein the data for synchronizing execution comprises a beacon signal comprising instructions to substantially simultaneously execute the at least one leg of the first type and the at least one leg of the second type.

In some implementations, wherein the at least one leg of the first type is the at least one leg associated with options instruments and the at least one leg of the second type is the at least one leg associated with futures instruments.

In some implementations, wherein satisfaction of the at least one leg of the first type comprises matching the at least one leg of the first type to an order in a first order book, and satisfaction of the at least one leg of the second type comprises matching the at least one leg of the second type to an order in a second order book.

In some implementations, wherein the first computer network destination is located in a different location from the second computer network destination.

In some implementations, wherein the routing system is further configured to store the first portion and the second portion in a database, wherein the database comprises clusters of memory devices distributed across multiple database servers.

In some implementations, wherein the at least one processor is further configured to retrieve the first portion and the second portion from the database using a caching mechanism.

In another aspect, implementations provide a computer-implemented method, including: receiving, by a computer system and from a user device, an electronic message comprising a first portion and a second portion, wherein the first portion comprises data indicative of at least one leg of a first type and the second portion comprises at least one leg of a second type; determining, by the computer system, a first computer network destination based on an indication in the first portion of the electronic message and a second computer network destination based on an indication in the second portion of the electronic message; determining, by the computer system, that the at least one leg of the first type is satisfied at the first computer network destination and the at least one leg of the second type is satisfied at the second computer network destination; transmitting, by the computer system and through a wide area computer network, the first portion and a second electronic message to the first computer network destination and transmitting the second portion and a third electronic message to the second computer network destination, the second electronic message and the third electronic message comprising data for synchronizing execution of the at least one leg of the first type at the first computer network destination and execution of the at least one leg of the second type at the second computer network destination; receiving, by the computer system and through the wide area computer network, at least one confirmation electronic message indicating that the at least one leg of the first type and the at least one leg of the second type were executed substantially simultaneously; generating, by the computer system, an execution report that indicates that the at least one leg of the first type and the at least one leg of the second type were executed substantially simultaneously; and transmitting, by the computer system, the execution report to at least one portable electronic device connected to the wide area computer network. Implementations can include one or more of the following features.

In some implementations, wherein the first computer network destination is an exchange system configured to process the at least one leg of the first type and the second computer network destination is an exchange system configured to process the at least one leg of the second type.

In some implementations, wherein the data for synchronizing execution comprises a first time stamp indicating an execution time of the at least one leg of the first type and a second time stamp indicating an execution time of the at least one leg of the second type, wherein the first time stamp is equal to the second time stamp In some implementations, wherein transmitting the first portion and the second electronic message to the first computer network destination and transmitting the second portion and the third electronic message to the second computer network destination comprise: synchronizing a clock of the first computer network destination with a clock of the second computer network destination; generating the first time stamp for the at least one leg of the first type and generating the second time stamp for the at least one leg of the second type; and transmitting the first time stamp to the first computer network destination and transmitting the second time stamp to the second computer network destination.

In some implementations, wherein the data for synchronizing execution comprises a beacon signal comprising instructions to substantially simultaneously execute the at least one leg of the first type and the at least one leg of the second type.

In some implementations, wherein the at least one leg of the first type is the at least one leg associated with options instruments and the at least one leg of the second type is the at least one leg associated with futures instruments.

In some implementations, wherein satisfaction of the at least one leg of the first type comprises matching the at least one leg of the first type to an order in a first order book, and satisfaction of the at least one leg of the second type comprises matching the at least one leg of the second type to an order in a second order book.

In another aspect, implementations provide a non-transitory computer-readable storage medium comprising at least one program for execution by at least one processor of a computer system, the at least one program including instructions which, when executed by the at least one processor, cause the computer system to perform operations comprising: receiving, by a routing system in the computer system and from a user device, an electronic message comprising a first portion and a second portion, wherein the first portion comprises data indicative of at least one leg of a first type and the second portion comprises at least one leg of a second type; determining, by the at least one processor, a first computer network destination based on an indication in the first portion of the electronic message and a second computer network destination based on an indication in the second portion of the electronic message; determining, by the at least one processor, that the at least one leg of the first type is satisfied at the first computer network destination and the at least one leg of the second type is satisfied at the second computer network destination; transmitting, by the at least one processor and through a wide area computer network, the first portion and a second electronic message to the first computer network destination and transmitting the second portion and a third electronic message to the second computer network destination, the second electronic message and the third electronic message comprising data for synchronizing execution of the at least one leg of the first type at the first computer network destination and execution of the at least one leg of the second type at the second computer network destination; receiving, by the at least one processor and through the wide area computer network, at least one confirmation electronic message indicating that the at least one leg of the first type and the at least one leg of the second type were executed substantially simultaneously (e.g., at the same time or within a few milliseconds of each other); generating, by the at least one processor, an execution report that indicates that the at least one leg of the first type and the at least one leg of the second type were executed substantially simultaneously; and transmitting, by the computer system, the execution report to at least one portable electronic device connected to the wide area computer network.

In some implementations, wherein the data for synchronizing execution comprises a first time stamp indicating an execution time of the at least one leg of the first type and a second time stamp indicating an execution time of the at least one leg of the second type, wherein the first time stamp is equal to the second time stamp.

In some implementations, wherein transmitting the first portion and the second electronic message to the first computer network destination and transmitting the second portion and the third electronic message to the second computer network destination comprise: synchronizing a clock of the first computer network destination with a clock of the second computer network destination; generating the first time stamp for the at least one leg of the first type and generating the second time stamp for the at least one leg of the second type; and transmitting the first time stamp to the first computer network destination and transmitting the second time stamp to the second computer network destination.

The details of one or more embodiments of the subject matter described in this specification are set forth in the accompanying drawings and the description below. Other potential aspects, features, and advantages will be apparent from the description, the drawings, and the claims.

BRIEF DESCRIPTION OF THE DRAWINGS

FIG. 4 is a flowchart of an example process for executing an inter-exchange spread order, according to some implementations.

DETAILED DESCRIPTION

Figure 1:
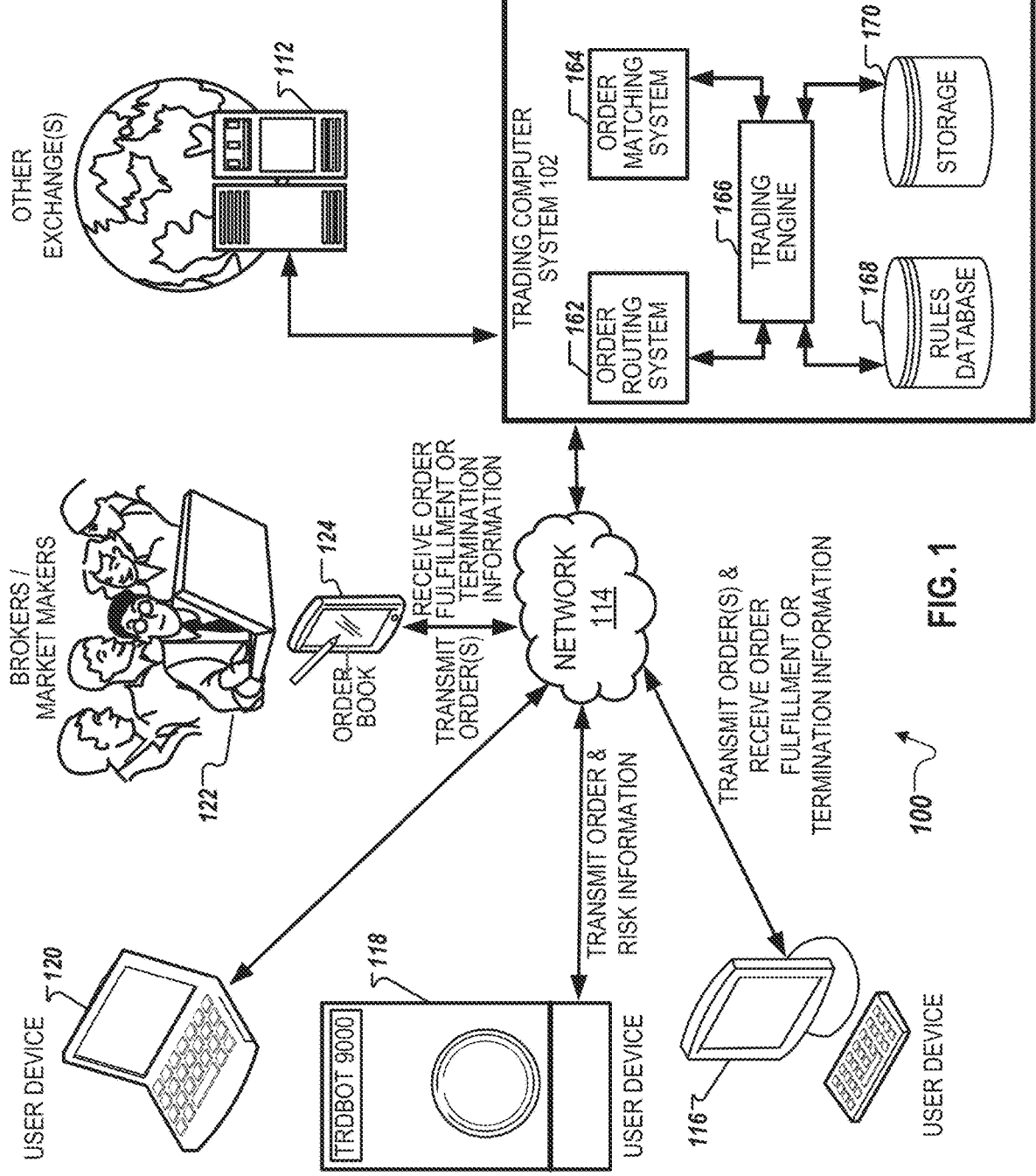
FIG. 1 is an example diagram of a trading computer system and associated networks, devices, and users, according to some implementations.

Volatility Index (VIX) options market participants may seek to hedge VIX options positions on Options Exchange by entering into transactions of VIX futures contracts on a Futures Exchange. Separate transactions are executed on two different exchanges, e.g., an Options Exchange and a Futures Exchange. Execution of separate transactions on two different exchanges may result in execution risk, legging risk, and risk of price drift arising from separate execution of the VIX options position and VIX futures position.

In some implementations, VIX options market participants may seek to hedge VIX options position on an Options Exchange using a VIX options combination ("combo") position. For example, a VIX options combo transaction includes the purchase (sale) of a VIX options call and the sale (purchase) of a VIX options put with the same expiration date and the same strike price. It may be more difficult to manage a hedge that includes a VIX options combo position than a hedge that has a delta-one product like VIX futures contracts. In some implementations, VIX options market participants may also seek to hedge VIX options positions using volatility swaps in the over-the-counter (OTC) market. The VIX options combo position or volatility swap in the OTC market is less transparent and potentially less capital efficient than hedging using a VIX futures contract position, and may introduce a single counter-party risk that is not present on a centrally cleared product like VIX futures contracts that are cleared by Options Clearing Corporation (OCC).

Liquidity providers in VIX options on an Options Exchange (such as market-makers on the Options trading floor, electronic market-makers, and off-floor solicited market-makers and liquidity providers) may engage in two multi-part transactions in the course of liquidity provision and risk and capital management. First, the liquidity provider enters into a transaction for a VIX options combo position when providing liquidity for a market participant looking to trade VIX options hedged by a VIX options combo position. Second, the liquidity provider may choose to convert the VIX options combo position into an equivalent futures contract position by entering into an Exchange of Contract for Related Position (ECRP) transaction and exchanging the VIX options combo position for a VIX futures contract position.

An inter-exchange VIX spread is a trading strategy where a trader takes offsetting positions in the same or similar financial instruments across different exchanges. The inter-exchange VIX spread can be used to exploit price discrepancies between the same or related assets traded on different exchanges. By holding both a long and a short position in related assets, the trader can reduce the risk of price movements in either direction. The disclosed techniques herein provide an inter-exchange VIX spread order that can make the trading and hedging process more efficient, reduce risk, and expand access to hedging with futures contracts through on-exchange trading.

FIG. 1 is a diagram of an exemplary trading environment 100 for conducting electronic transactions involving an inter-exchange VIX spread order. In some examples, the inter-exchange VIX spread order can include Volatility Index (VIX) futures contracts traded on a Futures Exchange and VIX options traded on an Options Exchange. In some examples, the first exchange can be one of various futures contracts exchange, such as the Chicago Mercantile Exchange (CME), Intercontinental Exchange (ICE), Tokyo Commodity Exchange (TOCOM), Singapore Exchange (SGX), etc. and the second exchange can be one of various options exchange, such as Euronext, Tokyo Stock Exchange (TSE), London Stock Exchange (LSE), Hong Kong Exchanges and Clearing Limited (HKEX), etc.

The trading environment 100 includes a trading computer system and the associated networks, devices, and users. Generally, the term "user" can refer to any entity that interacts with the trading computer system and/or associated networks and devices. Users can include, for example, market makers and other market professionals, brokers, institutional traders, individual traders, and automated trading systems. The diagram can include a trading computer system 102, other exchanges 112, a network 114, user devices 116, 118, 120, market makers/brokers 122, and electronic order book 124.

The trading computer system 102 can be implemented in a fully electronic manner, or in a hybrid manner that combines electronic trading with aspects of traditional open-outcry systems. In some implementations, the trading computer system 102 can be implemented as a server, a computer, or other device or processing component using proprietary software designed and implemented to achieve the functionality described herein. The trading computer system 102 can be distributed or subdivided between a plurality of entities, e.g., multiple computing devices. The trading computer system 102 can receive orders for trading financial instruments locally onsite or from remote electronic devices. The financial instruments can include securities such as stocks, options, futures contracts, debt instrument indexes, or other derivatives associated with an underlying asset.

Network 114 connects the various components within the trading environment 100, and can be configured to facilitate communications between those components. Network 114 can, for example, be configured to enable the exchange of electronic communications that include order and order fulfillment information between connected devices, such as an electronic order book 124 and the trading computer system 102.

Network 114 can include one or more networks or subnetworks, each of which can include a wired or wireless data pathway. Network 114 can, for example, include one or more of the Internet, Wide Area Networks (WANs), Local Area Networks (LANs), or other packet-switched or circuit-switched data networks that are capable of carrying electronic communications (e.g., data or voice communications). The connection mechanisms of the network 114 can include a wired connection, a wireless connection, or a combination thereof. For example, the connection can be a physical connection, such as a wired Ethernet connection. In another example, the connection can be a wireless connection, such as a cellular telephone network, 802.11, 802.16, 802.20 controls or components, a WiMax network, or any other type of network. Further, network 114 can be a public network, such as the Internet, a private network, such as an intranet, or combinations thereof, and can utilize a variety of networking protocols now available or later developed, including but not limited to TCP/IP based networking protocols.

To protect communications between the various systems, devices, and components connected to network 114, network 114 can implement security protocols and measures such that data identifying order or bid information, or parties placing orders or quotes, can be securely transmitted. Network 114 can, for example, include virtual private networks (VPNs) or other networks that enable secure connections to be established with trading computer system 102.

User devices 116, 118, and 120 can include portable or stationary electronic devices, such as smartphones, laptops, desktops, and servers that include user interfaces to display information and receive user input, and that are configured to communicate over a computer network. User devices 116, 118, and 120 can communicate with the trading computer system 102 over network 114 using a proprietary protocol, or a message-based protocol such as financial information exchange (FIX), implemented over TCP/IP.

For example, various implementations can leverage a messaging protocol such as the FIX (Financial Information exchange) protocol, which is an electronic messaging protocol used by financial institutions to facilitate electronic communication for trading and other activities in the financial markets. The protocol defines a set of rules and guidelines for exchanging real-time market data, trading instructions, and other financial information between different parties. FIX messages can be sent in a specific format, which includes a message header, body, and trailer. The header contains information about the sender and receiver, while the body contains the actual message data. The trailer includes a checksum to ensure the message integrity. The typical range of volume of FIX messages on a high-speed exchange network can vary widely depending on a number of factors, such as the type of trading activity, the number of participants, and the level of market volatility. However, in many cases, a high-speed exchange network can operate to process millions of FIX messages per second during peak trading periods. Indeed, operating FIX protocol on high-speed exchange networks can achieve low latencies in the range of microseconds or nanoseconds to allow market participants to execute trades quickly and efficiently in rapidly changing market conditions. As trading activity and market complexity continue to grow, FIX messaging systems and protocols can be further optimized to support even higher volumes of data and faster processing speeds. The FIX protocol uses a text-based tag-value format for market participants to submit orders and bids.

In addition, implementations can extend messaging protocols for delivering market data in real time in a binary format optimized for high-speed and low-latency data transmission. For example, implementations can leverage an ITCH ("Information Technology Change") protocol, which is a specialized messaging protocol used by some financial institutions for rapid and efficient dissemination of market data. ITCH transmits market data in a binary format, which is more compact and quicker to process than text-based formats (e.g., FIX protocol). This binary format is optimized for high-speed data transmission and low-latency communication. The ITCH messaging protocol is representative, but the implementations are not so limited. In fact, the implementations can use other binary messaging protocols with fixed field lengths to drive the multicast communication session with ultra-low latency. Each binary message can include a series of fields, where each field represents a specific data element. The field lengths are predefined and fixed, allowing for fast parsing and processing by the exchange computer network (e.g., network 114) for each participant to receive up-to-date market data.

User devices 116, 118, and 120 can transmit user input, such as order information for an inter-exchange VIX spread order, to the trading computer system 102, and can also receive data from the trading computer system 102 indicating that an order has been filled or canceled.

Users such as brokers/market makers 122 can also place orders and receive information about order fulfillment or termination through electronic order book 124, including a record of outstanding public customer limit orders that can be matched against future incoming orders.

The trading computer system 102 includes an order routing system (ORS) 162, an order matching system (OMS) 164, a trading engine 166, a database of trading rules and algorithms 168, and storage 170. In some implementations, the trading computer system 102 is a distributed computer system. The order routing system (ORS) 162, the order matching system (OMS) 164, and the trading engine 166 described above can be implemented by one or more processors, such as general-purpose processors (e.g., a microprocessor), special-purpose processors (e.g., an application-specific integrated circuit (ASIC) or digital-signal processor (DSP), programmable-logic devices (e.g., a field programmable gate array (FPGA)), or any other processor components now known or later developed. One or more processors can carry out one or more instructions using one or more arithmetic, logical, and/or input/output operations to perform a process as described in FIG. 4.

The order routing system (ORS) 162 determines whether a received order or quote is to be executed at the trading computer system 102, or should instead be redirected to another exchange 112, and can include processing systems that enable the management of high data volumes. The ORS 162 can, for example, receive order or quote information for the purchase or sale of financial instruments from one or more user devices 116, 118, and 120. In some implementations, the ORS 162 can also be connected to or include a touch-screen order routing and execution system accessible by brokers on the exchange floor, such as a public automated routing (PAR) system.

Upon receiving an order or quote, the ORS 162 determines if the destination specified in the received order or quote is the trading computer system 102. If the trading computer system 102 is not the destination and the received order is not an inter-exchange VIX spread order, the ORS 162 can forward or transmit the order or quote to another exchange 112, which can be either the destination exchange, or an exchange en route to the destination exchange. If the ORS 162 determines that the trading computer system 102 is the destination of the received order or quote or the received order is an inter-exchange VIX spread order, the ORS 162 can forward or transmit the received order or quote to the order matching system 164.

The order matching system (OMS) 164 can include processing systems that analyze and manipulate orders according to matching rules stored in the database 168. The OMS 164 can also include an electronic book (EBOOK) of orders and quotes with which incoming orders to buy or sell are matched, according to the matching rules. The EBOOK can also be implemented in a separate database such as storage 170, which can include multiple mass storage memory devices for the storage of order and quote information. When the OMS 164 determines that a match exists for an order (for example, when a bid matches an offer for sale), the OMS 164 can mark the matched order or quote with a broker-specific identifier so that the broker sending the order or quote information can be identified.

In some implementations, if the received order is an inter-exchange VIX spread order including an options component and a futures component, the OMS 164 determines whether the options component matches any order in an options order book of an options exchange and whether the futures component matches any order in an order book of a futures exchange. When the OMS 164 determines that both matches exist for the options component and the futures component (for example, the options component matches an options order and the futures component matches a futures order), the OMS 164 can forward the inter-exchange VIX spread order to the ORS 162. The ORS 162 forwards the options component of the inter-exchange VIX spread order to the options exchange for execution and forwards the futures component of the inter-exchange VIX spread order to the futures exchange for execution.

The trading engine 166 can be implemented using a combination of software and hardware. The trading engine 166 can, for example, be implemented as one or more hardware processors configured to execute one or more algorithms, as described in further detail below.

The trading engine 166 can provide multicast capability between a selected set of liquidity providers and one or more liquidity consumers. The streaming is implemented using a multicast mode of communication. Because the filtering effectively reduces the size of the data used for multicast communication, the implementations can improve communication efficiency. Moreover, trading engine 166 can operate a messaging protocol in which payload data is arranged in binary format with data fields in fixed length so that communication overhead can be further reduced.

The order from the received data can be a market order. In some implementations, other types of derivative contracts (e.g., forwards, swaps, and options) can be traded. In some implementations, a user can receive settlement by transferring the underlying asset to the user. In other implementations, the user can receive a cash-value settlement.

In some implementations, the trading computer system 102 is a distributed computer system that includes an order entry port (e.g., by network 114), an order routing system (e.g., ORS 162), an order matching system (e.g., OMS 164), and a trading engine (e.g., trading engine 166). The distributed computer system can operate multiple hardware and software processes in parallel configurations. The order entry port receives the order from the data sent to the trading computer system by a user device, and the order routing system is configured to route the order to a destination associated with the order. As an example, the destination can include other exchanges 112, based on matching rules stored on database 168 and the configuration of the order matching system to match the order to the destination in the other exchanges 112.

Storage 170 and database 168 store and handle data in a manner that satisfies the privacy and security requirements of the trading computer system 102 and its users, and can store one or more of telemetric data, user profiles, user history, and rules and algorithms for matching quotes, bids, and orders.

The storage 170 and database 168 can implement a Database Management System (DBMS) to manage, store, retrieve, and organize matching rules and order and quote data in a structured and efficient manner. The DBMS can provide a centralized and structured storage system for order data. The matching rules and order and quote data are organized into tables, rows, and columns, making it easier to manage and query. The DBMS can cache the results of frequently executed queries in memory to reduce the need for repeated database access. The DBMS can support replication and clustering to improve scalability and fault tolerance. Replication involves creating copies of the database on multiple servers, while clustering involves distributing data across multiple servers. For example, order routing system 162 can store inter-exchange VIX spread order data in the storage 170 or database 168.

In some implementations, the storage 170 and database 168 are configured in clusters to distribute order data across multiple database servers. This improves read and write performance and provides redundancy. Database clustering ensures that the database remains available even if one or more database servers in the cluster experience failures. When a database server goes down, the cluster can automatically redirect order data traffic to healthy database servers, minimizing downtime. By distributing the order data across multiple database servers, clustering balances the load on each database server. This prevents any single database server from becoming a bottleneck and ensures that resources are used efficiently.

In some implementations, caching mechanisms are employed to store frequently accessed data (e.g., weights) in memory. This reduces the need for repetitive database queries and speeds up response times. Memory caching mechanisms can improve system performance, reduce response times, and minimize the latency associated with data access. For example, trading engine 166 can retrieve inter-exchange VIX spread order data from the storage 170 and database 168 using a caching mechanism.

The storage 170 and database 168 can be a main memory, a static memory, or a dynamic memory. The storage 170 and database 168 can include, but cannot be limited to computer readable storage media such as various types of volatile and non-volatile storage media, including but not limited to random access memory, read-only memory, programmable read-only memory, electrically programmable read-only memory, electrically erasable read-only memory, flash memory.

Upon completion of a trade (through the floor in open outcry as entered into the PAR system, or through automatic execution through the OMS 164 and trading engine 166), the fill information is passed through the OMS 164 and the ORS 162 to one or more user devices 116, 118, and 120, and to the trading engine 166. The trading engine 166 matches the buy side and sell side of a trade, and forwards the matched trade to a third-party organization that verifies the proper clearance of the trade, such as the Options Clearing Corporation (OCC) where the securities can be options, or Depository Trust Company (DTC) where the securities can be equities. The OMS 164 also formats the quote and sale update information and sends that information through an internal distribution system that refreshes display screens on the floor, in addition to submitting the information to a quote and trade dissemination service such as, in the case of options, the Options Price Reporting Authority (OPRA). In the case of Equities, the information would be submitted to the Securities Information Processor (SIP).

The trading computer system 102 can securely transmit information based on data received over successive periods of time to coupled user computing devices (e.g., user devices 116, 118, 120) that are themselves configured to display the information. The information can be displayed, for example, within a graphical user interface of an application that facilitates continuous real-time generation, trading, and settlement through the trading computer system 102.

The trading computer system 102 can execute an inter-exchange VIX spread order including a futures component and an options component by the following process further described, for example, with respect to FIG. 4. Once the futures component and the options component are both executed simultaneously or nearly simultaneously, the trading computer system 102 can notify the one or more user devices (e.g., user devices 116, 118, 120) of the successful execution. As noted above, the information is included in market data dynamically provided to (e.g., using specialized messaging protocols such as FIX protocol, ITCH protocol, etc.) and synchronously refreshed on networked computer systems (e.g., user devices 116, 118, and 120).

The electronic order book 124 can include a trade at the settlement order book, and the determined transaction price of the order from the received data is based on a daily settlement price. In some implementations, the electronic order book 124 can be a mark-to-model order book, and the determined transaction price of the order from the received data is based on a daily settlement price determined by one or more financial models. For example, the daily settlement price can be provided by a financial model when a market for the underlying asset is not available, e.g., for complex financial instruments. In some implementations, the daily settlement price can be determined from a non-total return forward curve with a known expected dividend return.

In some implementations, the trading computer system 102 is a distributed computer system. The distributed computer system can operate multiple hardware and software processes in parallel configurations. The trading computer system 102 receives the order from a user device and routes the order to a destination associated with the order. As an example, the destination can include other exchanges 112 (e.g., an options exchange and a futures exchange), based on matching rules to match the order to the destination in the other exchanges 112.

Figure 2:
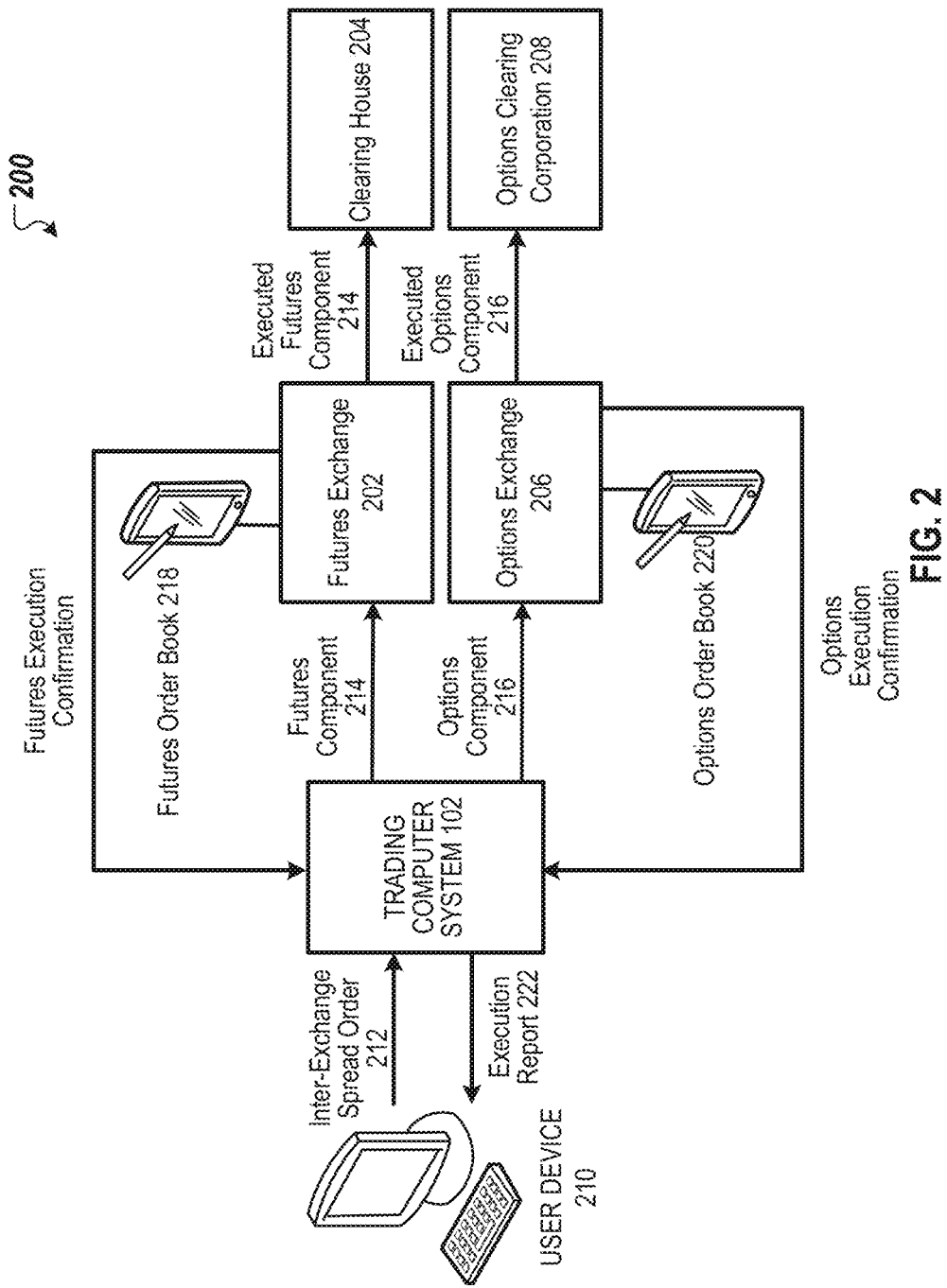
FIG. 2 is an example diagram of a trading computer system configured to trade an inter-exchange VIX spread order, according to some implementations.

FIG. 2 is a diagram of an example trading system 200 configured to trade an inter-exchange VIX spread order, according to some implementations. The trading system 200 includes the trading computer system 102 of FIG. 1, futures exchange 202, clearing house 204, options exchange 206, options clearing corporation 208, and user device 210. The user device 210 can include user devices 116, 118, and 120 of FIG. 1.

A user submits an inter-exchange VIX spread order 212 including futures component 214 and options component 216 through the user device 210. The futures component 214 can include one or more futures legs and the options component 216 can include one or more options legs. For example, the futures component includes two futures legs: selling 1 VIX futures leg expiring on Dec. 20, 2023 with a delta of −1 and buying 2 VIX futures legs expiring on Jan. 17, 2023 with a delta of 1. The options component includes two options legs: buying 20 VIX options calls expiring on Dec. 20, 2023 with a delta of 0.40 and buying 35 VIX options puts expiring on Jan. 17, 2023 with a delta of −0.60. Delta refers to the sensitivity of an options price to changes in the price of the underlying asset. Specifically, it measures the rate of change in the options price per $1 change in the price of the underlying asset. Delta values range from −1 to 1. For example, a call option with a delta of 0.40 indicates that for every $1 increase in the underlying asset price, the options price would increase by $0.40.

As shown in FIG. 2, the trading computer system 102 can forward or transmit the futures component 214 to the futures exchange 202 if the trading computer system 102 determines that the futures component 214 matches one or more orders in the futures order book 218. The trading computer system 102 can forward or transmit the options component 216 to the options exchange 206 if the trading computer system 102 determines that the options component 216 matches one or more orders in the options order book 220. In some implementations, when the trading computer system 102 receives the inter-exchange VIX spread order 212 (for example, an order message including a flag indicating that the order is an inter-exchange VIX spread order), the trading computer system 102 can forward or transmit the futures component 214 and the options component 216 to the futures exchange 202 and the options exchange 206, respectively. In some cases, the futures exchange 202 can determine whether the futures component 214 matches one or more orders in the futures order book 218, while options exchange 206 can determine whether the options component 216 matches one or more orders in the options order book 220.

The futures component 214 is executed on the futures exchange 202 at the same time as the options component 216 is executed on the options exchange 206. In some implementations, the futures component 214 and the options component 216 are executed simultaneously or approximately simultaneously at a time point specified by the trading computer system 102. For example, the trading computer system 102 can assign an options time stamp to the options component 216 when forwarding the options component 216 to the options exchange 206 and assign a futures time stamp to the futures component 214 when forwarding the futures component 214 to the futures exchange 202. The options time stamp and the futures time stamp are the same and represent a time point in the future for the execution of the options component 216 and the futures component 214 at that time point.

In some implementations, the trading computer system 102 utilizes a beacon signal to synchronize the execution of the options component 216 and the futures component 214.

A beacon signal is an electronic signal that is continuously or intermittently broadcasted to indicate its presence, provide information, or act as a synchronization signal. The beacon signal can be distributed electronically across exchanges, providing a precise reference point for transaction timing. In some examples, a centralized timing system synchronized using Global Positioning System (GPS)-based clocks or atomic clocks, generates a beacon signal. The beacon signal contains a precise timestamp synchronized via GPS or another highly accurate timing protocol. The trading computer system 102 transmits the options component 216 and the futures component 214 to the options exchange 206 and the futures exchange 202, respectively. The options component 216 and the futures component 214 are now queued at the options exchange 206 and the futures exchange 202, respectively, ready for execution. The options component 216 and the futures component 214 are held in a pending state and waiting for a beacon signal. The beacon signal is then distributed via high-speed, low-latency networks (e.g., network 114) from a centralized timing system to the trading computer system 102, options exchange 206, and futures exchange 202 simultaneously. This allows the trading computer system 102, options exchange 206, and futures exchange 202 to operate on the same time reference and can act at the precise moment the beacon signal is received. Upon receiving the beacon signal, both the options exchange 206 and the futures exchange 202 execute the options component 216 and the futures component 214 at the exact same time.

Upon execution of the futures component 214 and the options component 216, the futures exchange 202 can report confirmation of futures execution to the trading computer system 102 and the options exchange 206 reports confirmation of options execution to the trading computer system 102. The trading computer system 102 can transmit an execution report 222 to the user device 210. In some implementations, the execution report 222 can be a detailed message or document that provides information about the status of a trade order that has been executed in the financial markets. The execution report 222 can include order information (such as order ID, execution ID, order type, order status), execution information (such as Trade Date and Time, Execution Price, Executed Quantity), trade direction (such as side, financial instrument), trading venue (such as exchange), fees (such as commission, other charges), client information (such as account number, client ID), and additional information (such as execution broker, order routing).

The futures exchange 202 can transmit the executed futures component 214 to clearing house 204. The clearing house 204 is a financial intermediary that facilitates the exchange of payments, securities, or derivatives transactions by acting as a middleman between buyers and sellers, ensuring the smooth functioning of transactions, reducing counterparty risk, and enhancing the overall stability of the financial system. The clearing house 204 is responsible for settling the executed futures component 214. The options exchange 206 can transmit the executed options component 216 to options clearing corporation (OCC) 208. The OCC 208 can act as a central clearinghouse for options contracts traded on U.S. options exchanges and certain futures contracts. The OCC primary role is to ensure the smooth functioning and stability of the options market by acting as a guarantor for the fulfillment of options contracts. This reduces the risk that one party in a transaction will default on their obligations. The OCC 208 is responsible for settling the executed options component 216.

The communication between trading computer system 102 and two exchanges 202, 206 and the communication between the two exchanges 202, 206 and clearing house 204/options clearing corporation 208 are performed through a high-speed and low-latency wide area computer network (hereinafter "computer network"). For example, the computer network can be a microwave transmission network, Fiber-Optic Network, Optical Carrier (OCx) Network, etc. The computer network can reduce the number of hops (such as routers, switches, or servers) and optimize processing at each hop. Reduction of hops refers to a reduction of the number of points where data is queued or processed.

In some examples, the computer network can use a User Datagram Protocol (UDP) instead of the Transmission Control Protocol (TCP). TCP involves more checks and error corrections, which adds overhead and increases latency. UDP is a lightweight, connectionless protocol that sends packets without waiting for acknowledgment or performing error correction, thus reducing latency. In some examples, the computer network can use precise time synchronization protocols, such as Precision Time Protocol (PTP) or Network Time Protocol (NTP), to ensure systems (e.g., trading computer system 102, futures exchange 202, options exchange 206, clearing house 204, and options clearing corporation 208) coupled to the computer network are synchronized to the same time source, e.g., GPS clocks or atomic clocks.

In some implementations, the computer network includes a redundant backup network route. If the primary network route experiences a failure or delay, the computer network automatically switches to a backup network route, ensuring that trading data transmission continues with minimal disruption.

In some examples, the inter-exchange VIX spread order 212 is a VIX options/VIX futures spread order. If a user that places a VIX options/VIX futures spread order is both an Options Trading Privilege Holder (TPH) and a Futures Exchange Trading Privilege Holder, the trading computer system 102 can forward the VIX futures component to a futures exchange on behalf of the user in a capacity as a Futures TPH. The user acts as an executing Futures TPH for the VIX futures component on the futures exchange.

In some implementations, the trading computer system 102 is an independent trading platform, which is not affiliated with the options exchange 206 and the futures exchange 202. In some implementations, the trading computer system 102 is a part of the options exchange 206 or the futures exchange 202. For example, the trading computer system 102 is a trading platform of the options exchange 206. The trading computer system 102 can (i) forward the futures component 214 to the futures exchange 202 for execution, and (ii) execute the options component 216 at the same time as the futures exchange 202 executes the futures component 214.

Figure 3:
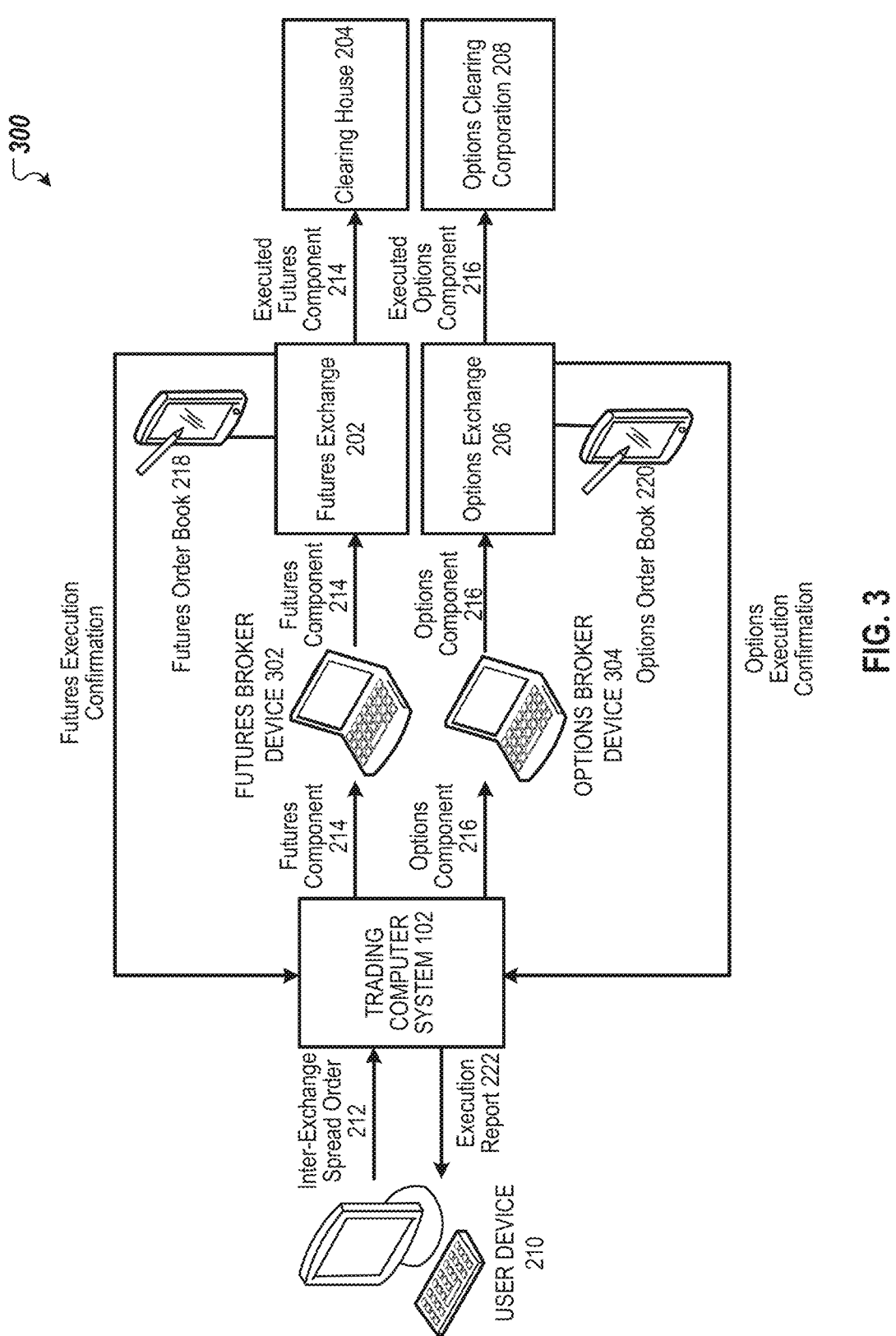
FIG. 3 is an example diagram of another trading computer system configured to trade an inter-exchange VIX spread order, according to some implementations.

FIG. 3 is a diagram of an example trading system 300 configured to trade an inter-exchange VIX spread order, according to some implementations. The difference between FIG. 3 and FIG. 2 is that the example trading system 300 of FIG. 3 includes an additional futures broker device 302 and an additional options broker device 304. If the user submitting the inter-exchange VIX spread order 212 is neither an Options TPH nor a Futures TPH, the trading computer system 102 forwards the futures component 214 to the futures exchange 202 through the futures broker device 302 and forwards the options component 216 to the options exchange 206 through the options broker device 304. The futures broker is a Futures TPH and the options broker is an Options TPH. In some implementations, the trading computer system 102 can forward the futures component 214 and the options component 216 through a single routing broker that is both an Options TPH and a Futures TPH. In some implementations, the user is an Options TPH and not a Futures TPH. The trading computer system 102 can forward the options component 216 directly to the options exchange 206 without the options broker device 304 and forward the futures component 214 to the futures exchange 202 through the futures broker device 302. In some implementations, the user is a Futures TPH and not an Options TPH. The trading computer system 102 can forward the futures component 214 directly to the futures exchange 202 without the futures broker device 302 and forward the options component 216 to the options exchange 206 through the options broker device 304.

In some examples, the inter-exchange VIX spread order 212 is a VIX options/VIX futures spread order. If a user that submits a VIX options/VIX futures spread order is not both an Options TPH and a Futures TPH, the trading computer system can forward the VIX futures component through a routing broker (e.g., a futures broker) to the Futures Exchange in the routing broker capacity as a Futures TPH. The routing broker acts as an executing Futures TPH for the VIX futures component on the Futures Exchange.

A routing broker can be a Futures Exchange TPH that is registered with the Commodity Futures Trading Commission (CFTC) as a Futures Commission Merchant (FCM) or Introducing Broker (IB). The trading computer system can provide the routing broker with the information to transmit to the Futures Exchange on behalf of the user who is not a Futures Exchange TPH. Fees charged by a routing broker for execution of the VIX futures component include any brokerage fee for routing the VIX futures component to the Futures Exchange for execution and the transaction fees charged to the routing broker by the Futures Exchange relating to the execution of the futures component on the Futures Exchange.

In some implementations, the trading computer system is a part of an Options Exchange. In order to submit a VIX options/VIX futures spread order to the trading computer system, the submitter can be an Options TPH or a sponsored user with a trading privilege on an Options Exchange. Any submitter of a VIX options/VIX futures spread order that is a broker and any broker that represents a VIX options/VIX futures spread order on the Options Exchange needs to be registered with the Securities and Exchange Commission (SEC) as a Broker-Dealer and with the CFTC as an FCM or IB. Any individuals associated with the broker need to have any required securities industry and futures industry registrations. Any submitter who submits a VIX options/VIX futures spread order to the trading computer system and is not a futures TPH needs to have a brokerage agreement in place with a routing broker designated by the Options Exchange. The routing broker can report the VIX futures component to a Futures Exchange. Any market participant registered with the Options Exchange can submit a VIX options/VIX futures spread order utilizing the routing broker.

In some implementations, if Futures Exchange TPHs or market participants are Options TPHs, the Futures Exchange TPHs or market participants can submit a VIX options/VIX futures spread order to an Options Exchange. In some implementations, the Futures Exchange TPHs or market participants can submit a VIX options/VIX futures spread order to the Options Exchange through a routing broker that is an Options Exchange TPH or otherwise can route the spread order through another broker that is an Options Exchange TPH.

FIG. 4 is a flowchart of an example process 400 for executing an inter-exchange spread order, according to some implementations. The example process 400 is described as being performed by a trading computer system, such as trading computer system 102 of FIG. 1-FIG. 3. The example process 400 shown in FIG. 4 can be modified or reconfigured to include additional, fewer, or different steps (not shown in FIG. 4), which can be performed in the order shown or in a different order.

At 402, the trading computer system receives an inter-exchange VIX spread order (e.g., an electronic message) including an options component (e.g., a first portion) and a futures component (e.g., a second portion) from a user device (e.g., user devices 116, 118, 120 of FIG. 1, user device 210 of FIGS. 2 and 3). The options component can include one or more options legs (e.g., at least one leg of a first type) and the futures component can include one or more futures legs (e.g., at least one leg of a second type). For example, a VIX options/VIX futures spread order can be a day order and may not be a good-til-cancelled or good-til-date order.

A user can submit an inter-exchange VIX spread order through a user device. The user can be an Options Trading Permit Holder (an Options TPH), including an Options TPH broker acting on behalf of sponsored users or customers. The user can be a party of a VIX options/VIX futures spread trade on the Options Exchange.

At 404, the trading computer system determines whether the options component matches (e.g., satisfies) any order in an options order book (e.g., a first order book) of an options exchange (e.g., a first computer network destination) and whether the futures component matches any order in an order book (e.g., a second order book) of a futures exchange (e.g., a second computer network destination). In some implementations, the options exchange and the futures exchange are located in different locations.

At 406, in response to the options component failing to match any order in the options order book or the futures component failing to match any order in the futures order book, the trading computer system cancels the inter-exchange VIX spread order and informs the user device of order cancellation. The options component and the futures component need to be executed simultaneously. Thus, the inter-exchange VIX spread order can only be executed when both the options component and the futures component have respective matching orders. If either the options component or the futures component fails to match any order in its order book, the inter-exchange VIX spread order is canceled (e.g., both the options component and the futures component are canceled). The trading computer system transmits a message indicating order cancellation to the user deice.

At 408, in response to the options component matching an order in the options order book and the futures component matching an order in the futures order book, the trading computer system forwards the options component to the options exchange and forwards the futures component to the futures exchange.

In some implementations, the trading computer system can assign an options time stamp (e.g., a first time stamp included in a second electronic message) to the options component and a futures time stamp (e.g., a second time stamp included in a third electronic message) to the futures component when forwarding the options component and the futures component. The options time stamp and the futures time stamp are the same and represent a time point in the future for the execution of the options component and the futures component at that time point.

At 410, the trading computer system receives one or more messages confirming the simultaneous execution of the options component and the futures component. For example, the options component and the futures component are executed at the time point indicated by the options time stamp and the futures time stamp. In some implementations, the trading computer system can utilize a beacon signal to synchronize the execution of the options component and the futures component.

At 412, the trading computer system transmits an execution report of the options component and the futures component to the user device. The execution report includes information on execution, e.g., execution amount, execution price, execution time, etc.

Execution of Inter-Exchange VIX Spread Order

In some examples, a VIX options component of an inter-exchange VIX spread order can be executed on an Options Exchange under Options rules. Upon execution of the VIX options component on the Options Exchange, the Options Exchange can report the execution price of the options component to the Options Price Reporting Authority (OPRA). The Options Exchange can also report to the Options TPH executing parties of successful execution. The Options Exchange further reports the executed VIX options component to OCC for clearing. In some implementations, the OCC is designated by both parties of the VIX options component trade. In some implementations, the OCC is designated by a party to the trade if the party is both am Options Exchange TPH and Futures Exchange TPH or by a routing broker on behalf of a party to the trade if that party is not both an Options Exchange TPH and Futures Exchange TPH.

The VIX futures component is executed on a Futures Exchange. The execution of the VIX futures component on the Futures Exchange is similar to consummating a block trade on the Futures Exchange. The VIX futures component needs to satisfy the requirements of the Futures Exchange. The Futures Exchange has certain requirements to determine whether the attempted submission (e.g., the futures component is forwarded from the trading computer system) of the futures component is permitted. If any of the requirements of the Futures Exchange are not satisfied, the Futures Exchange rejects the VIX futures component. One example requirement is that the price of the futures component is within a predetermined range. The requirements include a plurality of risk requirements. There are multiple risk limits set by a clearing member. If the VIX futures component exceeds risk limits, the Futures Exchange rejects the VIX futures component.

If these requirements are satisfied, the Futures Exchange can apply a net long/net short risk control to each side of the VIX futures component. The net long/net short risk control is set by a clearing member that can clear each side of the VIX futures component trade.

If the VIX futures component of the trade satisfies the requirements and passes the net long/net short risk control, the VIX futures component is executed on the Futures Exchange. The Futures Exchange transmits an execution report of the VIX futures component to the user through the trading computer system. The Futures Exchange disseminates the VIX futures component through market data with an indicator indicating that the VIX futures component is part of an inter-exchange spread trade. The Futures Exchange transmits the executed VIX futures component to OCC for clearing.

If the VIX futures component of the trade does not satisfy the requirements and pass the net long/net short risk control, the Futures Exchange rejects the submission of the VIX futures component and reports the rejection of the VIX futures component to an Options Exchange and the user through the trading computer system. The VIX futures component is not executed. Meanwhile, the Options Exchange nullifies the VIX options component, transmits a report of the nullification to the user through the trading computer system, and corrects the prior print of the VIX options component on OPRA and the Options market data. The VIX options component of the trade is not executed.

Pricing

Pricing of VIX options component is processed electronically. If the VIX options component of a VIX Options/VIX Futures Spread trade includes one VIX options leg, the VIX options component can be executed at a price that is equal to or better than the price of the leg on the Options Exchange simple book and at a price that is better than the price of any public customer/non-professional order in that leg on the Options Exchange simple book.

If the VIX options component of a VIX Options/VIX Futures Spread trade has more than one VIX options leg, the VIX options legs may not trade at a net price, because that would: (i) cause any VIX options leg to be executed at a price of zero; (ii) cause any VIX options leg to be executed at a price worse than the price of that leg in the Options simple book; (iii) cause any VIX options leg to be executed at a price worse than the price that would be available if the VIX options legs legged into the Options Exchange simple book; (iv) cause any VIX options leg to be executed at a price worse than the synthetic best bid (SBB) or synthetic best offer (SBO) (SBBO) or equal to the SBBO when there is a public customer/non-professional order on any leg comprising the SBBO.

For example, if the VIX options legs have a ratio equal to or greater than, e.g., one-to-three (0.333) and less than or equal to, e.g., three-to-one (3.00) (conforming), at least one of the VIX options legs can execute at a price that improves the best bid (offer) for the at least one of the VIX options legs by at least one minimum increment.

If the VIX options legs have a ratio, e.g., less than one-to-three (0.333) or greater than, e.g., three-to-one (3.00) (nonconforming), any VIX options leg with a public customer/non-professional order at the best bid (offer) can execute at a price that improves the price of the public customer/non-professional order on the Options Exchange simple book by at least one minimum increment.

Pricing of the VIX options component processed in open outcry can be provided depending on whether the VIX options legs are conforming. If the VIX options legs are conforming and if there is a public customer/non-professional order on every leg including the SBBO, at least one component of the complex order can execute at a price that improves the price of the public customer/non-professional order on the Options Exchange simple book for that component by at least one minimum increment. If the VIX options components are nonconforming and if there is a public customer/non-professional order on any leg(s) comprising the SBBO, the component(s) of the complex order for the leg(s) with a public customer/non-professional order at the best bid (offer) can execute at a price that improves the price of that public customer/non-professional order on the Options Exchange simple book by at least one minimum increment.

Pricing of the VIX futures component can be provided as below. Any VIX futures leg can be executed at a price that is within the daily quotation range of the VIX futures leg. The daily quotation range refers to the range of prices of a VIX futures leg on a business day up until the trading computer system receives the VIX futures leg. The price ranges from the lowest price of a transaction or lowest best bid (whichever is lower) (excluding any zero or no bids) for the VIX futures leg to the highest price of a transaction or highest best offer (whichever is higher) (excluding any zero or no offers) for the VIX futures leg.

In some implementations, the minimum increment of the net price of a VIX options/VIX futures spread order is $0.01 (expressed on the Options Exchange as $0.01 and on the Futures Exchange as 0.01 index points). In some implementations, the minimum increment of the individual VIX options and VIX futures components of a VIX Options/VIX Futures Spread trade is $0.01 (expressed on the Options Exchange as $0.01 and on the Futures Exchange as 0.01 index points).

Inter-Exchange Spread Order Risk Offset

The risk offset requirement may be adjusted as the Options Exchange and the Futures Exchange gain experience with the use of the VIX Options/VIX Futures Spread order type by market participants. The risk offset requirement may be different for Inter-Exchange Spread orders involving other products based on the characteristics of, and interrelationship between, other products.

A VIX options leg of a VIX Options/VIX Futures Spread order can provide a risk offset between a minimum of 25% and a maximum of 125% to any VIX futures leg of the order with the same expiration date. As long as the risk offset requirement is satisfied, there is no limit on the number of VIX options or VIX futures legs that a VIX Options/VIX Futures Spread order may include.

The risk offset can be measured based on the delta values of VIX options and VIX futures legs of a VIX Options/VIX Futures Spread order with the same expiration date. The delta value of a VIX options leg is a calculation of the expected change in the price of the VIX options contract given a $1.00 change in the price of the VIX futures contract with the same expiration date. For example, the delta value of a VIX futures leg is 1.

A long position (buying a VIX options call/selling a VIX options put/buying a VIX futures leg) has a positive delta value. A short position (selling a VIX options call/buying a VIX options put/selling a VIX futures leg) has a negative delta value. In some examples, the multiplier of a VIX options contract is 100, and thus the delta value of a VIX options leg is multiplied by 100. In some examples, the multiplier of a VIX futures contract is 1,000, and the delta value of the VIX futures leg is multiplied by 1,000.

After grouping together each VIX options leg and VIX futures leg of a VIX Options/VIX Futures Spread order with the same expiration date, the risk offset requirement is satisfied if the VIX options leg(s) in each group have a delta direction that is opposite the delta direction of the VIX futures leg(s) in that group and the overall net delta of each group among all of the VIX Options and VIX futures legs in that group has an absolute value that is equal to or between 0.25 and 1.25.

Each VIX options leg is grouped together with any VIX futures leg having the same expiration date (the expiration date of the VIX options leg is the same as the expiration date of the VIX futures leg in a group). If there is more than one VIX options leg in a group, a net delta of these VIX options legs is determined. If there is more than one VIX futures leg in a group, a net delta of these VIX futures legs is determined.

The VIX options leg(s) in each group can have a positive net delta value if the VIX futures leg(s) in that group have a negative net delta value, or a negative net delta value if the VIX futures leg(s) in that group have a positive net delta value. The overall net delta of each group among all of the VIX Options and VIX futures legs in that group can have an absolute value that is equal to or between 0.25 and 1.25.

If a VIX futures leg is not grouped together with any VIX options leg, that group does not satisfy the risk offset requirement. If a VIX options leg is not grouped together with any VIX futures leg, that group does not satisfy the risk offset requirement.

All VIX Options/VIX Futures Spread order messages, except for auction responses, can include delta values for each of the VIX options legs included in the VIX Options/ VIX Futures Spread order. A delta value for a VIX Options leg can be computed using different techniques. A delta value for a VIX futures leg is 1 or –1, depending on whether it is a long position or short position.

The Options trading system (Options System) can validate that the risk offset requirement is satisfied for each VIX Options/VIX Futures Spread strategy type including VIX options legs and VIX futures legs included in that strategy type on each trading day. The validation can be based on the delta values provided in the first order message received by the Options System during a trading day for the strategy type which passes the validation. Until the validation is satisfied, the Options System can reject any VIX Options/VIX Futures Spread order for the strategy type that does not satisfy the risk offset requirement.

Auction responses are not required to include delta values, because auction responses respond with respect to a strategy type for which the risk offset requirement has already been validated.

Once a VIX Options/VIX Futures Spread order for a particular strategy type passes the validation on a trading day, subsequent VIX Options/VIX Futures Spread orders for that strategy type can be accepted for the remainder of the trading day based on the validation of the strategy occurring on that trading day. This can avoid a situation in which VIX Options/VIX Futures Spread orders are accepted with an appropriate risk offset based on the delta values at that time, and later on the trading day no one is able to trade against those orders if delta values were to change during the trading day.

The Regulatory Division can implement regulatory surveillance on a T+1 basis to review the reasonableness of the delta values provided in any VIX Options/VIX Futures Spread order. The delta values are used by an Options System to validate that the risk offset requirement is satisfied on a trading day for a VIX Options/VIX Futures Spread strategy type. Providing unreasonable delta values may result in disciplinary actions depending upon the facts and circumstances. However, the disciplinary actions do not impact submitted orders or executed trades.

In some examples, a VIX Options/VIX Futures Spread order is submitted with the following legs: selling 1 VIX futures leg expiring on Dec. 20, 2023 with a delta of –1, buying 2 VIX futures legs expiring on Jan. 17, 2023 with a delta of 1, buying 20 VIX options calls expiring on Dec. 20, 2023 with a delta of 0.40, buying 35 VIX options puts expiring on Jan. 17, 2023 with a delta of –0.60.

The 1 short VIX futures leg expiring on Dec. 20, 2023 is grouped with the 20 long VIX options legs expiring on Dec. 20, 2023 (Group 1). The 2 long VIX futures legs expiring on Jan. 17, 2023 are grouped with the 35 short VIX options expiring on Jan. 17, 2023 (Group 2). In determining the net delta of each group, the VIX futures component is the numerator in the calculation against which there is a risk offset and the VIX options component is the denominator in the calculation representing the risk offset.

The net delta of Group 1 is $(-1\times1,000)/(20\times0.40\times100)=-1,000/800=|-1.25|=1.25$. The net delta of Group 2 is $(2\times1,000)/(35\times-0.60\times100)=-2,000/2100=|0.95|=0.95$. Both groups satisfy the risk offset requirement since the VIX options side in each group has a delta direction that is opposite the delta direction of the VIX futures leg in that group, and the overall net delta of each group has an absolute value equal to or between 0.25 and 1.25.

In some examples, a VIX Options/VIX Futures Spread order is submitted with the following legs: Selling 1 VIX futures leg expiring on Dec. 20, 2023 with a delta of –1, Buying 2 VIX futures legs expiring on Jan. 17, 2023 with a delta of 1, Buying 20 VIX options calls expiring on Dec. 20, 2023 with a delta of 0.40, Buying 35 VIX options puts expiring on Jan. 17, 2023 with a delta of –0.60, Buying 1 VIX futures leg expiring on Feb. 21, 2023. The risk offset requirement is not satisfied, because the additional VIX futures leg (Buying 1 VIX futures leg expiring on Feb. 21, 2023) has no offsetting VIX options leg.

In some examples, a VIX Options/VIX Futures Spread order is submitted with the following legs: Selling 1 VIX futures leg expiring on Dec. 20, 2023 with a delta of –1, Buying 2 VIX futures legs expiring on Jan. 17, 2023 with a delta of 1, Buying 20 VIX options calls expiring on Dec. 20, 2023 with a delta of 0.40, Buying 35 VIX options puts expiring on Jan. 17, 2023 with a delta of –0.60, Selling 20 VIX options calls expiring on Feb. 21, 2023 with a delta of 0.50. The risk offset requirement is not satisfied, because the additional VIX options leg (Selling 20 VIX options calls expiring on Feb. 21, 2023 with a delta of 0.50) has no offsetting VIX futures leg.

Inter-Exchange VIX Spread Order Execution Mechanisms

Inter-Exchange Spread orders may be executed on the Options Exchange through execution mechanisms on the Options Exchange. The execution mechanisms can be one of (i) Incoming order matched against responses or other contra-side interest in a Complex Order Auction (COA); (ii) Incoming order matched against an order resting on the Complex Order Book (COB); (iii) Paired (buy and sell) orders submitted and matched against each other or against responses via the Complex Automated Improvement Mechanism (C-AIM); (iv) Incoming order executed by broker on the Options trading floor against bids/offers on the trading floor. Options market-makers may also enter into VIX Options/VIX Futures Spread trades on the Options trading floor through a broker.

Complex Order Auction

The Complex Order Auction (COA) is an auction process for complex orders. A complex order can include a spread order.

Upon receipt of a COA-eligible order, the Options System initiates a COA process by sending a COA auction message with designated information about the order to subscribers to Options data feeds that include COA auction messages.

A COA-eligible order is a buy (sell) complex order with user instructions to initiate a COA that is priced: (i) equal to or higher (lower) than the SBB (SBO) for the complex order;

or (ii) higher (lower) than the price of buy (sell) complex orders resting at the top of the COB.

For example, if any of the bids (offers) on the simple book including the SBB (SBO) is represented by a public customer/non-professional order, the complex order can be priced at least one minimum increment higher (lower) than the SBB (SBO).

During a designated response time interval, which may not exceed 3000 milliseconds, eligible participants (such as Options market-makers) may submit COA auction responses. At the end of the response time interval, an incoming COA-eligible order is allocated against contra-side complex interest in price priority.

If there is contra-side interest at the same price, the contra-side interest is allocated to COA responses and unrelated orders resting in the COB in accordance with the VIX options COA allocation algorithm (e.g., first priority to public customer/non-professional COA responses and unrelated orders in price-time priority allocation and second priority to other COA responses and unrelated orders in pro-rata priority). Any portion of an incoming COA-eligible order that is not executed in the above manner may rest in the COB.

Complex Order Book

The Complex Order Book (COB) is an electronic book of complex orders. The COB is utilized for incoming complex orders with user instructions not to initiate a COA or not eligible for COA and the remainder of any COA-eligible orders not executed by COA.

An incoming order with user instructions not to initiate a COA or that is not eligible for a COA executes in whole or in part against contra-side complex interest in price priority. If there is contra-side interest at the same price, the contra-side interest is allocated to unrelated orders resting in the COB in accordance with the VIX options COB allocation algorithm (e.g., pro-rata allocation). Any remaining portion of an incoming order not executed as described above may rest in the COB.

Complex Automated Improvement Mechanism

The Complex Automated Improvement Mechanism (C-AIM) is an auction process for a complex order submitted by an agent (referred to as an agency order) that the agent seeks to match against principal interest or a solicited complex order (referred to as an initiating order).

The initiating order can stop the entire agency order at a stop price that satisfies specified criteria. The agent can specify: (i) a single price at which it seeks to execute the agency order against the initiating order; or (ii) an initial stop price and instruction to automatically match the price and size of all C-AIM responses and other trading interest up to a designated limit price or at all prices that improve the stop price.

The Options System initiates a C-AIM auction process by sending a C-AIM auction message with designated information of the agency order to subscribers that elect to receive C-AIM auction messages. During the C-AIM auction period, which may be between 100 milliseconds and 3 seconds, eligible participants (such as Options market-makers) may submit C-AIM auction responses.

C-AIM buy (sell) responses are capped at the following prices that exist at the conclusion of the C-AIM Auction: (i) the better of the SBO (SBB) or the offer (bid) of a resting complex order at the top of the COB; or (ii) one minimum increment lower (higher) than the better of the SBO (SBB) or the offer (bid) of a resting complex order at the top of the COB if the best bid (offer) of any component of the complex strategy or resting complex order, respectively, is a public customer/non-professional order.

The Options System caps the size of a C-AIM response, or the aggregate size of complex orders on the COB and C-AIM responses for the same executing firm ID at the same price, at the size of the agency order.

At the conclusion of the C-AIM auction, the Options System executes the agency order against the initiating order or contra-side complex interest (which includes complex orders on the COB and C-AIM responses) at the best price(s), to the price at which the balance of the agency order can be fully executed (referred to as the final auction price). Any execution price(s) can be at or between the SBBO and the best prices of any complex orders resting on each side of the COB at the conclusion of the C-AIM Auction.

If the C-AIM auction results in no price improvement, the Options System executes the agency order at the final auction price (which equals to the stop price) against contra-side complex interest in the following order: (I) public customer/non-professional orders on the COB (in time priority); (II) the initiating order for the greater of (i) one contract or (ii) up to 50% of the agency order if there is contra-side complex interest from one other responder at the final auction price or 40% of the agency order if there is contra-side complex interest from two or more other responders at the final auction price; (III) all other contra-side complex interest (in a pro-rata manner); and (IV) the initiating order to the extent that there are any remaining contracts.

If the C-AIM auction results in price improvement for the agency order and the agent selects single price submission, the Options System executes the agency order at each price level better than the stop price against contra-side interest in the following order: (I) public customer/non-professional orders on the COB (in time priority); and (II) all other contra-side complex interest (in a pro-rata manner).

If the final auction price equals the stop price, the Options System executes any remaining agency order contracts at the stop price in the order applicable for no price improvement.

If the C-AIM auction results in price improvement for the agency order and the agent selected auto-match at each price level better than the final auction price (or at each price level better than the final auction price up to the limit price if the agent specified one), the Options System (i) executes the agency order against the initiating order for the number of contracts equal to the aggregate size of all other contra-side complex interest; (ii) executes the agency order against that contra-side complex interest in the order used for Price Improvement with Single-Price Submission above; and (iii) at the final auction price, executes those contracts at that price in the order applicable for no price improvement.

If the agent selects a single-price submission, it may elect for the initiating order to have the last priority to trade against the agency order. If the agent elects the last priority, the Options System executes the initiating order against any remaining agency order contracts at the stop price after the agency order is allocated to all other contra-side interests (in the order used for Price Improvement with Single-Price Submission above) at all prices equal to or better than the stop price.

Options Trading Floor

An Options Floor Broker represents a VIX Options/VIX Futures Spread order for execution on the trading floor in the VIX options trading pit on the Options trading floor.

On the options trading floor, disclosure is made to the trading crowd that the order is a VIX Options/VIX Futures Spread order, and the legs of the order and the prices at which the VIX futures legs of the order are to be filled. Contra-side bids and offers from the trading crowd with the highest bid and lowest offer have priority. In some implementations, the allocation of two or more bids (offers) at the same price from the trading crowd occurs in time priority or equally if time priority cannot be reasonably determined.

Inter-Exchange Spread orders can use Options Rules in relation to stock-option orders. A floor broker on the Options trading floor that holds opposite side VIX Options/VIX Futures Spread orders may cross these orders. Disclosure is made to the VIX options trading crowd that the orders are VIX Options/VIX Futures Spread orders, as well as the legs of the orders and the prices at which the VIX futures legs of the orders are to be filled.

The floor broker requests bids and offers for the VIX Options/VIX Futures Spread in the VIX options trading pit. After providing an opportunity for those bids and offers to be made, the floor broker can (i) bid above the highest bid in the market and give a corresponding offer at the same price or at prices differing by the minimum increment; or (ii) offer below the lowest offer in the market and give a corresponding bid at the same price or at prices differing by the minimum increment.

If the higher bid or lower offer is not taken, the floor broker may cross the orders at the higher bid or lower offer by announcing the cross by public outcry and giving the quantities and prices. Options Rules relating to crosses involve facilitation and solicited orders and crossing participation entitlements.

Inter-Exchange Spread Trade Compliance

The VIX options component of a VIX Options/VIX Futures Spread trade can be subject to the regulatory jurisdiction of the Securities and Exchange Commission (SEC), and the futures component of a VIX Options/VIX Futures Spread trade can be subject to the regulatory jurisdiction of the CFTC.

The Options Exchange can regulate conduct relating to VIX Options/VIX Futures trades with respect to compliance with Options Exchange rules and may bring disciplinary actions for violations of Options Exchange rules.

The Futures Exchange can regulate conduct relating to VIX Options/VIX Futures trades with respect to compliance with Futures Exchange rules and may bring disciplinary actions for violations of Futures Exchange rules.

The Options Exchange and the Futures Exchange may each bring disciplinary actions for the same conduct in relation to VIX Options/VIX Futures Spread trades that violate both Options Exchange and Futures Exchange rules.

Options Exchange TPHs and market participants, including customers, can be subject to Futures Exchange regulatory jurisdiction in relation to VIX Options/VIX Futures Spread trades and can be subject to Futures Exchange rules.

Futures Exchange rules, among other things, subject to any person initiating or executing a transaction or subject to the Futures Exchange rules directly or through an intermediary, and any person for whose benefit such a transaction has been initiated or executed, to the jurisdiction of the Futures Exchange and to the Futures Exchange rules.

Futures Exchange Rule 604 requires compliance with applicable laws, including among other things, the CEA and CFTC regulations. The Futures Exchange can amend the list of rules under Futures Exchange Rules with which market participants that are not TPHs are required to comply, including Futures Exchange rules relating to Inter-Exchange Spreads.

As regulated in the Futures Exchange rule relating to Inter-Exchange Spreads, prohibited activities include: (i)

any conduct that violates Inter-Exchange Spread rule or any other Futures Exchange rule; and (ii) any conduct that violates any other applicable regulatory requirements relating to Inter-Exchange Spreads, including any applicable Options rules relating to Inter-Exchange Spreads.

The VIX options component of an Inter-exchange VIX spread order includes all required options fields, and the VIX futures component of an Inter-exchange VIX spread order includes all required futures fields. The VIX futures order and trade information can be maintained in the audit trail.

The regulatory teams for the Options Exchange and the Futures Exchange can have access to the order, trade, regulatory, and other data from the Options Exchange and the Futures Exchange relating to inter-exchange VIX spread orders and trades.

The regulatory employees that currently perform cross-market reviews for the Options Exchange and the Futures Exchange that currently are part of the Options Exchange regulatory team and have a dotted reporting line to the Futures Exchange Regulation can perform the surveillance reviews of VIX Options/VIX Futures Spread orders and trades for both the Options Exchange and the Futures Exchange.

The Options Exchange and the Futures Exchange (along with other trading venue affiliates) maintain an information-sharing agreement, which allows for the sharing of information between the Options Exchange and the Futures Exchange.

The type of information that may be shared between the Options Exchange and the Futures Exchange under the Information Sharing Agreement encompasses information relating to Inter-exchange VIX spread orders and trades.

DCM Core Principle 9

Core Principle 9 requires a board of trade to provide a competitive, open, and efficient market and mechanism for executing transactions that protect the price discovery process of trading in the centralized market of the board of trade.

A competitive, open, and efficient market and mechanism for executing VIX Options/VIX Futures Spreads can exist in the Options market. Order exposure and price discovery can take place on the Options market. An TPH can participate in the market for VIX Options/VIX Futures Spreads directly if the TPH is an Options TPH or indirectly through an Options broker.

The price discovery process of trading in Futures Exchange centralized market cannot be detrimentally impacted. It is not expected that VIX Options/VIX Futures Spreads can become a predominant method of executing VIX Futures transactions. VIX Options/VIX Futures Spread transactions can have offset requirements and can need to be priced within the daily quotation range in VIX Futures.

VIX Options/VIX Futures Spreads have a bona fide business purpose to provide a more efficient mechanism to execute cross-product transactions in a manner that reduces risk to market participants and facilitates hedging.

Core Principle 9 allows a board of trade to authorize, for bona fide business purposes, among other things, an exchange of futures in connection with a cash commodity transaction or an exchange of futures for cash commodities. VIX Options/VIX Futures Spreads fit within either of these transaction types and are authorized by the Futures Exchange rules.

DCM Core Principles

Core Principle 2 (Compliance with Rules)

Futures Exchange can have regulatory jurisdiction over market participants that submit VIX Options/VIX Futures Spread orders and execute VIX Options/VIX Futures spread trades.

All market participants can have impartial access to submit VIX Options/VIX Futures Spread orders through appropriately registered brokers. Like with the Joint Venture (JV), VIX Options/VIX Futures Spread trades are consummated by Options TPHs.

Futures Exchange rules include existing prohibitions against market manipulation and fraudulent, non-competitive, and disruptive trading practices that can apply to VIX Options/VIX Futures Spread orders and trades.

The Futures Exchange can conduct automated trade surveillance of VIX Options/VIX Futures Spread orders and trades.

The Futures Exchange has an information sharing agreement in place with the Options Exchange that can provide the Futures Exchange with access to VIX options information related to VIX Options/VIX Futures Spread orders and trades.

Core Principle 3 (Contracts not Readily Subject to Manipulation)

The VIX Index, which is the underlier for both VIX options and VIX futures, is a broad-based security index. The VIX Index is a financial benchmark designed to be a market estimate of the expected volatility of the S&P 500 Index.

Core Principle 4 (Prevention of Market Disruption)

VIX Options/VIX Futures Spread trades can be subject to: (i) trading halt provisions on the Options, such as market-wide circuit breaker trading halts if the S&P 500 Index declines 7%, 13%, or 20% during regular trading hours; (ii) VIX futures price limit provisions during extended trading hours which prevent trades 70% above and 30% below the prior daily settlement price and can apply to each VIX futures leg of a VIX Options/VIX Futures Spread trade; and (iii) VIX options trading halt provisions during global trading hours, including VIX options trading halts when E-Mini S&P 500 Index futures traded on Chicago Mercantile Exchange are in a limit state.

These provisions can contribute to reducing the potential risk of market disruption from VIX Options/VIX Futures Spread trades.

The Futures Exchange and Options Exchange TPHs can be required by the Futures Exchange and Options Exchange rules to keep records relating to VIX Options/VIX Futures Spread orders and trades, and the Futures Exchange can have the ability to obtain this information as needed in the performance of the Futures Exchange regulatory functions relating to these orders and trades through authority under the Futures Exchange rules.

Core Principle 5 (Position Limitations or Accountability)

The VIX futures component of a VIX Options/VIX Futures Spread trade can be subject to Futures Exchange current position accountability provisions and levels applicable to VIX futures.

Core Principle 6 (Emergency Authority)

The Futures Exchange emergency authority can apply with respect to VIX Options/VIX Futures Spread orders and trades. The Futures Exchange can confer and coordinate with the Options Exchange as appropriate in any exercise of this authority.

Core Principle 7 (Availability of General Information)

The Futures Exchange can describe in its rules pertinent information regarding Inter-Exchange Spreads and the requirements applicable to VIX Options/VIX Futures Spread orders and trades.

Core Principle 8 (Daily Publication of Trading Information)

The Futures Exchange can disseminate through market data the price and size of VIX Options/VIX Futures Spread trades and each VIX futures component of a VIX Options/VIX Futures Spread trade with an indicator of an Inter-Exchange Spread transaction.

The Futures Exchange can include the trading volume from the VIX futures components of VIX Options/VIX Futures Spread trades within the VIX futures trading volume information and as a separate daily amount of VIX futures trading volume as part of the information that the Futures Exchange makes publicly available on a daily basis on the Futures Exchange website.

Core Principle 10 (Trade Information)

The Futures Exchange can maintain information relating to the futures components of VIX Options/VIX Futures trades as part of its audit trail and this information can be accessible to the Futures Exchange Regulation for regulatory purposes.

Core Principle 11 (Financial Integrity of Transactions)

The VIX futures components of VIX Options/VIX Futures Spread trades can be cleared by OCC, which is registered with the CFTC as a derivatives clearing organization and is subject to the provisions of the CEA and CFTC regulations relating to Derivative Clearing Organizations (DCOs).

Each VIX futures transaction is guaranteed by a Futures Exchange clearing member.

The VIX futures components of VIX Options/VIX Futures Spread trades can be subject to Futures Exchange net long/net long pre-trade risk control set by Futures Exchange clearing members that can enable clearing members to facilitate the management of their financial risk in relation to the futures components of VIX Options/VIX Futures Spread trades by the Futures Exchange TPHs for which they act as a clearing member.

Core Principle 12 (Protection of Markets and Market Participants)

Futures Exchange rules include existing prohibitions against abusive practices, including abusive practices committed by a party acting as an agent for a participant, that can apply in relation to VIX Options/VIX Futures Spread orders and trades.

Core Principle 13 (Disciplinary Procedures)

Futures Exchange maintains disciplinary procedures and rules that authorize the Futures Exchange to discipline market participants that commit Futures Exchange rule violations, including any rule violations relating to VIX Options/VIX Futures Spread orders and trades.

Core Principle 14 (Dispute Resolution)

Chapter 8 (Arbitration) of the Rulebook provides a mechanism for market participants to arbitrate disputes that arise out of transactions executed on or subject to the rules of the Futures Exchange, which can apply with respect to VIX Options/VIX Futures Spread trades.

Core Principle 18 (Recordkeeping)

Futures Exchange recordkeeping procedures can apply with respect to Futures Exchange records relating to VIX Options/VIX Futures Spread orders and trades, including trade records and investigatory and disciplinary files.

Core Principle 19 (Antitrust Considerations)

The creation of the VIX Options/VIX Futures Spread order type serves to: (i) increase access and remove barriers to entry to engage in cross-product transactions between VIX options and VIX futures; and (ii) increase participation in both the VIX options and VIX futures markets through cross-product trades and related transactions that flow from those trades in each of those markets.

The increased access serves to increase competition within the VIX options and VIX futures markets and the increased transaction activity and liquidity serves to increase competition with competitive products offered on other futures and options exchanges and in the OTC market.

Core Principle 20 (System Safeguards)

The Futures Exchange can conduct internal testing and testing with Options Exchange and external parties prior to the implementation of the changes to the current Futures Exchange trading system necessary to accommodate VIX Options/VIX Futures Spread orders and trades.

The Futures Exchange maintains a system that safeguards controls and procedures for its operations, as well as automated systems that can be utilized to facilitate the processing of VIX Options/VIX Futures Spread orders and trades.

Inter-Regulatory Spread Rule

As to Joint Venture Intermarket and Inter-Regulatory Spreads, the following principles can apply to spreading transactions involving Joint Venture Products.

1. Futures spreads involving Stock Index futures contracts may be bid or offered at a differential and if so bid or offered, such spreads may not be separated into their individual components.

Inter-Regulatory spread strategies involving Stock Index futures spread against Standard and Poor 100 or Standard and Poor 500 options traded on an Options Exchange may be bid or offered at a differential. If such spreads are bid or offered at a differential, they may not be separated into individual parts. The futures leg of such spreads can be priced within the daily quotation range. The price of the options leg of such spreads shall not touch the best bid or offer included in the order book but may touch but shall not go through the current best bid or offer prevailing in the trading crowd. The prices for both legs of such spreads shall be disseminated immediately and shall be identified as a spread. The price differential shall also be disseminated immediately.

Inter-Regulatory spreads involving Stock Index futures contracts spread against Standard and Poor 100 and/or Standard and Poor 500 options may be executed in any location in the Standard and Poor 100 or the Standard and Poor 500 options pit(s).

Figure 5:
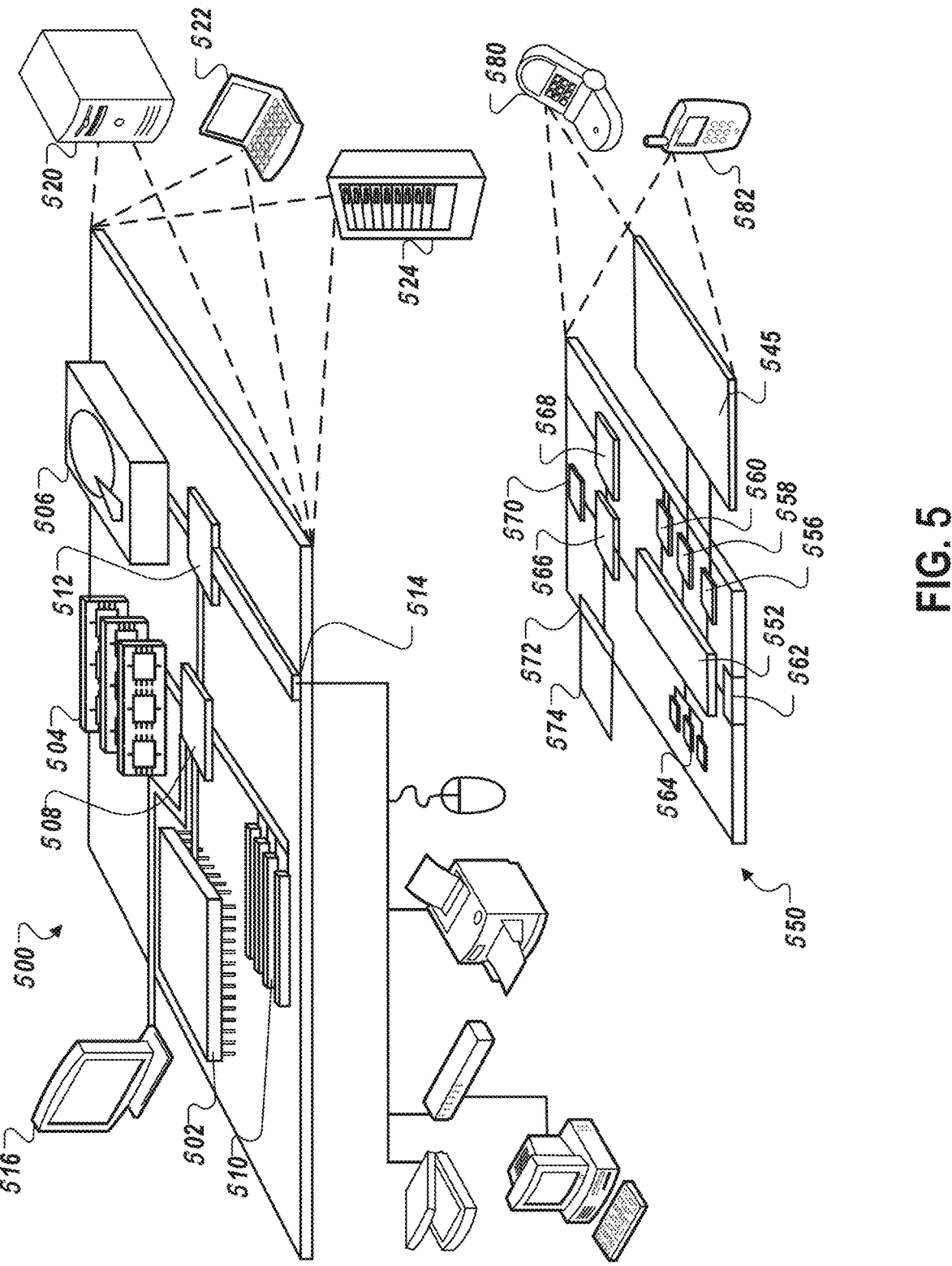
FIG. 5 is a block diagram of an example trading computer system that can be used in connection with the systems and methods described in this disclosure.

FIG. 5 is a block diagram of computing devices 500, 550 that can be used to implement the systems and methods described in this disclosure, either as a client or as a server, a cloud server, or multiple servers. Computing devices 500 and 550 are intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations described and/or claimed in this document.

Computing device 500 includes a processor 502, memory 504, a storage device 506, a high-speed interface 508 connecting to memory 504 and high-speed expansion ports 510, and a low-speed interface 512 connecting to low-speed bus 514 and storage device 506. Each of the components 502, 504, 506, 508, 510, and 512, are interconnected using various busses, and can be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high-speed interface 508. In other implementations, multiple processors and/or multiple buses can be used, as appropriate, along with multiple memories and types of memory. Also, multiple computing devices 500 can be connected, with each device providing portions of the necessary operations, e.g., as a server bank, a group of blade servers, or a multi-processor system.

The memory 504 stores information within the computing device 500. In one implementation, the memory 504 is a computer-readable medium. In one implementation, the memory 504 is a volatile memory unit or units. In another implementation, the memory 504 is a non-volatile memory unit or units.

The storage device 506 is capable of providing mass storage for the computing device 500. In one implementation, the storage device 506 is a computer-readable medium. In various different implementations, the storage device 506 can be a floppy disk device, a hard disk device, an optical disk device, a tape device, a flash memory or other similar solid-state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 504, the storage device 506, or memory on processor 502.

The high-speed controller 508 manages bandwidth-intensive operations for the computing device 500, while the low-speed controller 512 manages lower bandwidth-intensive operations. Such allocation of duties is exemplary only. In one implementation, the high-speed controller 508 is coupled to memory 504, display 516, e.g., through a graphics processor or accelerator, and to high-speed expansion ports 510, which can accept various expansion cards (not shown). In the implementation, low-speed controller 512 is coupled to the storage device 506 and low-speed expansion port 514. The low-speed expansion port, which can include various communication ports, e.g., USB, Bluetooth, Ethernet, wireless Ethernet, can be coupled to one or more input/output devices, such as a keyboard, a pointing device, a scanner, or a networking device such as a switch or router, e.g., through a network adapter.

The computing device 500 can be implemented in a number of different forms, as shown in the figure. For example, it can be implemented as a standard server 520, or multiple times in a group of such servers. It can also be implemented as part of a rack server system 524. In addition, it can be implemented in a personal computer such as a laptop computer 522. Alternatively, components from computing device 500 can be combined with other components in a mobile device (not shown), such as device 550. Each of such devices can contain one or more of computing devices 500, 550, and an entire system can be made up of multiple computing devices 500, 550 communicating with each other.

Computing device 550 includes a processor 552, memory 564, an input/output device such as a display 554, a communication interface 566, and a transceiver 568, among other components. The device 550 can also be provided with a storage device, such as a Microdrive or other device, to provide additional storage. Each of the components 550, 552, 564, 554, 566, and 568, are interconnected using various buses, and several of the components can be mounted on a common motherboard or in other manners as appropriate.

The processor 552 can process instructions for execution within the computing device 550, including instructions stored in the memory 564. The processor can also include separate analog and digital processors. The processor can provide, for example, for coordination of the other components of the device 550, such as control of user interfaces, applications run by device 550, and wireless communication by device 550.

Processor 552 can communicate with a user through control interface 558 and display interface 556 coupled to a display 554. The display 554 can be, for example, a TFT LCD display an OLED display, or other appropriate display technology. The display interface 556 can include appropriate circuitry for driving the display 554 to present graphical and other information to a user. The control interface 558 can receive commands from a user and convert them for submission to the processor 552. In addition, an external interface 562 can be provided in communication with processor 552, so as to enable near area communication of device 550 with other devices. External interface 562 can provide, for example, for wired communication, e.g., via a docking procedure, or for wireless communication, e.g., via Bluetooth or other such technologies.

The memory 564 stores information within the computing device 550. In one implementation, the memory 564 is a computer-readable medium. In one implementation, the memory 564 is a volatile memory unit or units. In another implementation, the memory 564 is a non-volatile memory unit or units. Expansion memory 574 can also be provided and connected to device 550 through expansion interface 572, which can include, for example, a SIMM card interface. Such expansion memory 574 can provide extra storage space for device 550, or can also store applications or other information for device 550. Specifically, expansion memory 574 can include instructions to carry out or supplement the processes described above, and can include secure information also. Thus, for example, expansion memory 574 can be provided as a security module for device 550, and can be programmed with instructions that permit secure use of device 550. In addition, secure applications can be provided via the SIMM cards, along with additional information, such as placing identifying information on the SIMM card in a non-hackable manner.

The memory can include, for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552.

Device 550 can communicate wirelessly through communication interface 566, which can include digital signal processing circuitry where necessary. Communication interface 566 can provide for communications under various modes or protocols, such as GSM voice calls, SMS, EMS, or MMS messaging, CDMA, TDMA, PDC, WCDMA, CDMA2000, or GPRS, among others. Such communication can occur, for example, through radio-frequency transceiver 568. In addition, short-range communication can occur, such as using Bluetooth, Wi-Fi, or other such transceiver (not shown). In addition, GPS receiver module 570 can provide additional wireless data to device 550, which can be used as appropriate by applications running on device 550.

Device 550 can also communicate audibly using audio codec 560, which can receive spoken information from a user and convert it to usable digital information. Audio codec 560 can likewise generate audible sound for a user, such as through a speaker, e.g., in a handset of device 550. Such sound can include sound from voice telephone calls, can include recorded sound, e.g., voice messages, music files, etc., and can also include sound generated by applications operating on device 550.

The computing device 550 can be implemented in a number of different forms, as shown in the figure. For example, it can be implemented as a cellular telephone 580. It can also be implemented as part of a smartphone 582, personal digital assistant, or other similar mobile devices.

A number of implementations have been described hereinabove. It should however be understood that various modifications can be made without departing from the spirit and scope of the disclosure. For example, various forms of the flows shown above can be used, with steps re-ordered, added, or removed. Accordingly, other implementations are within the scope of the disclosure and claims.

Embodiments and all of the functional operations and/or actions described in this specification can be implemented in digital electronic circuitry, or in computer software, firmware, or hardware, including the structures disclosed in this specification and their structural equivalents, or in combinations of one or more of them. Embodiments can be implemented as one or more computer program products, e.g., one or more modules of computer program instructions encoded on a computer-readable medium for execution by, or to control the operation of, data processing apparatus. The computer-readable medium can be a machine-readable database, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory, a random access memory or both.

Elements of a computer can include a processor for performing instructions and one or more memory devices for storing instructions and data. Generally, a computer will also include, or be operatively coupled to receive data from or transfer data to, or both, one or more mass databases for storing data, e.g., magnetic, magneto optical disks, or optical disks. However, a computer cannot have such devices. Moreover, a computer can be embedded in another device, e.g., a tablet computer, a mobile telephone, a personal digital assistant (PDA), a mobile audio player, or a Global Positioning System (GPS) receiver, to name just a few. Computer-readable media suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments can be implemented on a computer having a display device, e.g., a cathode ray tube (CRT), liquid crystal display (LCD), or light emitting diode (LED) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of one or more such back end, middleware, or front end components. The components of the system can be interconnected by any form or medium of digital data communication, e.g., a communication network.

The computing system can include clients and servers. A client and server are generally remote from each other and typically interact through a communication network. The relationship between client and server arises by virtue of computer programs running on the respective computers and having a client-server relationship with each other.

While this specification contains many specifics, these should not be construed as limitations on the scope of the disclosure or of what can be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features can be described above as acting in certain combinations and even initially claimed as such, one or more features from a claimed combination can in some cases be excised from the combination, and the claimed combination can be directed to a sub-combination or variation of a sub-combination.

Similarly, while actions are depicted in the drawings in a particular order, this should not be understood as requiring that such actions be performed in the particular order shown or in sequential order, or that all illustrated actions be performed, to achieve desirable results. Moreover, the separation of various system components in the embodiments described above should not be understood as requiring such separation in all embodiments, and it should be understood that the described program components and systems can generally be integrated together in a single software product or packaged into multiple software products.

Thus, particular embodiments have been described. Other embodiments are within the scope of the following claims. For example, the actions recited in the claims can be performed in a different order and still achieve desirable results.

We claim:

1. A computer system comprising:
   a routing system configured to: (i) receive an electronic message comprising a first portion and a second portion, (ii) determine a first computer network destination based on an indication in the first portion of the electronic message and a second computer network destination based on an indication in the second portion of the electronic message, and (iii) route, through a wide area computer network, the first portion to the first computer network destination and the second portion to the second computer network destination, wherein the first portion comprises data indicative of at least one leg of a first type and the second portion comprises at least one leg of a second type; and
   at least one processor connected to the routing system and configured to:
   determine that the at least one leg of the first type is satisfied at the first computer network destination and the at least one leg of the second type is satisfied at the second computer network destination;
   transmit, through the wide area computer network, a second electronic message to the first computer network destination and a third electronic message to the second computer network destination, the second electronic message and the third electronic message comprising data for synchronizing execution of the at least one leg of the first type at the first computer network destination and execution of the at least one leg of the second type at the second computer network destination;
   receive, through the wide area computer network, at least one confirmation electronic message indicating that the at least one leg of the first type and the at least one leg of the second type were executed substantially simultaneously;

generate an execution report that indicates that the at least one leg of the first type and the at least one leg of the second type were executed substantially simultaneously; and transmit instructions to a transmitter to transmit the execution report to at least one portable electronic device connected to the wide area computer network.

2. The computer system of claim 1, wherein the first computer network destination is an exchange system configured to process the at least one leg of the first type and the second computer network destination is an exchange system configured to process the at least one leg of the second type.

3. The computer system of claim 1, wherein the data for synchronizing execution comprises a first time stamp indicating an execution time of the at least one leg of the first type and a second time stamp indicating an execution time of the at least one leg of the second type, wherein the first time stamp is equal to the second time stamp.

4. The computer system of claim 3, wherein, to transmit the second electronic message to the first computer network destination and the third electronic message to the second computer network destination, the at least one processor is further configured to:

synchronize a clock of the first computer network destination with a clock of the second computer network destination;

generate the first time stamp for the at least one leg of the first type and generate the second time stamp for the at least one leg of the second type;

transmit the first time stamp to the first computer network destination; and transmit the second time stamp to the second computer network destination.

5. The computer system of claim 1, wherein the data for synchronizing execution comprises a beacon signal comprising instructions to substantially simultaneously execute the at least one leg of the first type and the at least one leg of the second type.

6. The computer system of claim 1, wherein the at least one leg of the first type is the at least one leg associated with options instruments and the at least one leg of the second type is the at least one leg associated with futures instruments.

7. The computer system of claim 1, wherein satisfaction of the at least one leg of the first type comprises matching the at least one leg of the first type to an order in a first order book, and satisfaction of the at least one leg of the second type comprises matching the at least one leg of the second type to an order in a second order book.

8. The computer system of claim 1, wherein the first computer network destination is located in a different location from the second computer network destination.

9. The computer system of claim 1, wherein the routing system is further configured to:

store the first portion and the second portion in a database, wherein the database comprises clusters of memory devices distributed across multiple database servers.

10. The computer system of claim 9, wherein the at least one processor is further configured to:

retrieve the first portion and the second portion from the database using a caching mechanism.

11. A computer-implemented method, comprising:

receiving, by a computer system and from a user device, an electronic message comprising a first portion and a second portion, wherein the first portion comprises data indicative of at least one leg of a first type and the second portion comprises at least one leg of a second type;

determining, by the computer system, a first computer network destination based on an indication in the first portion of the electronic message and a second computer network destination based on an indication in the second portion of the electronic message;

determining, by the computer system, that the at least one leg of the first type is satisfied at the first computer network destination and the at least one leg of the second type is satisfied at the second computer network destination;

transmitting, by the computer system and through a wide area computer network, the first portion and a second electronic message to the first computer network destination and transmitting the second portion and a third electronic message to the second computer network destination, the second electronic message and the third electronic message comprising data for synchronizing execution of the at least one leg of the first type at the first computer network destination and execution of the at least one leg of the second type at the second computer network destination;

receiving, by the computer system and through the wide area computer network, at least one confirmation electronic message indicating that the at least one leg of the first type and the at least one leg of the second type were executed substantially simultaneously;

generating, by the computer system, an execution report that indicates that the at least one leg of the first type and the at least one leg of the second type were executed substantially simultaneously; and transmitting, by the computer system, the execution report to at least one portable electronic device connected to the wide area computer network.

12. The computer-implemented method of claim 11, wherein the first computer network destination is an exchange system configured to process the at least one leg of the first type and the second computer network destination is an exchange system configured to process the at least one leg of the second type.

13. The computer-implemented method of claim 11, wherein the data for synchronizing execution comprises a first time stamp indicating an execution time of the at least one leg of the first type and a second time stamp indicating an execution time of the at least one leg of the second type, wherein the first time stamp is equal to the second time stamp.

14. The computer-implemented method of claim 13, wherein transmitting the first portion and the second electronic message to the first computer network destination and transmitting the second portion and the third electronic message to the second computer network destination comprise:

synchronizing a clock of the first computer network destination with a clock of the second computer network destination;

generating the first time stamp for the at least one leg of the first type and generating the second time stamp for the at least one leg of the second type; and transmitting the first time stamp to the first computer network destination and transmitting the second time stamp to the second computer network destination.

15. The computer-implemented method of claim 11, wherein the data for synchronizing execution comprises a beacon signal comprising instructions to substantially simultaneously execute the at least one leg of the first type and the at least one leg of the second type.

16. The computer-implemented method of claim 11, wherein the at least one leg of the first type is the at least one leg associated with options instruments and the at least one leg of the second type is the at least one leg associated with futures instruments.

17. The computer-implemented method of claim 11, wherein satisfaction of the at least one leg of the first type comprises matching the at least one leg of the first type to an order in a first order book, and satisfaction of the at least one leg of the second type comprises matching the at least one leg of the second type to an order in a second order book.

18. A non-transitory computer-readable storage medium comprising instructions, which when executed by at least one processor of a computer system, cause the computer system to perform operations comprising:

receiving, by a routing system in the computer system and from a user device, an electronic message comprising a first portion and a second portion, wherein the first portion comprises data indicative of at least one leg of a first type and the second portion comprises at least one leg of a second type;

determining, by the at least one processor, a first computer network destination based on an indication in the first portion of the electronic message and a second computer network destination based on an indication in the second portion of the electronic message;

determining, by the at least one processor, that the at least one leg of the first type is satisfied at the first computer network destination and the at least one leg of the second type is satisfied at the second computer network destination;

transmitting, by the at least one processor and through a wide area computer network, the first portion and a second electronic message to the first computer network destination and transmitting the second portion and a third electronic message to the second computer network destination, the second electronic message and the third electronic message comprising data for synchronizing execution of the at least one leg of the first type at the first computer network destination and execution of the at least one leg of the second type at the second computer network destination;

receiving, by the at least one processor and through the wide area computer network, at least one confirmation electronic message indicating that the at least one leg of the first type and the at least one leg of the second type were executed substantially simultaneously;

generating, by the at least one processor, an execution report that indicates that the at least one leg of the first type and the at least one leg of the second type were executed substantially simultaneously; and transmitting, by the computer system, the execution report to at least one portable electronic device connected to the wide area computer network.

19. The non-transitory computer-readable storage medium of claim 18, wherein the data for synchronizing execution comprises a first time stamp indicating an execution time of the at least one leg of the first type and a second time stamp indicating an execution time of the at least one leg of the second type, wherein the first time stamp is equal to the second time stamp.

20. The non-transitory computer-readable storage medium of claim 19, wherein transmitting the first portion and the second electronic message to the first computer network destination and transmitting the second portion and the third electronic message to the second computer network destination comprise:

synchronizing a clock of the first computer network destination with a clock of the second computer network destination;

generating the first time stamp for the at least one leg of the first type and generating the second time stamp for the at least one leg of the second type; and transmitting the first time stamp to the first computer network destination and transmitting the second time stamp to the second computer network destination.

\* \* \* \* \*